United States Patent
Shimazawa et al.

(10) Patent No.: US 6,671,141 B2
(45) Date of Patent: Dec. 30, 2003

(54) TUNNEL MAGNETORESISTIVE EFFECTIVE ELEMENT, A THIN FILM MAGNETIC HEAD, A MAGNETIC HEAD DEVICE AND A MAGNETIC DISK DRIVE DEVICE

(75) Inventors: Koji Shimazawa, Saku (JP); Noriaki Kasahara, Saku (JP); Satoru Araki, Saku (JP)

(73) Assignee: TDK Corporation, Tokyo (JP)

( * ) Notice: Subject to any disclaimer, the term of this patent is extended or adjusted under 35 U.S.C. 154(b) by 125 days.

(21) Appl. No.: 09/805,225

(22) Filed: Mar. 14, 2001

(65) Prior Publication Data

US 2001/0055184 A1 Dec. 27, 2001

(30) Foreign Application Priority Data

Mar. 17, 2000 (JP) ......................... 2000-077309

(51) Int. Cl.⁷ ................................................ G11B 5/39
(52) U.S. Cl. ..................................................... 360/324.2
(58) Field of Search .......................... 360/324.2, 324.1, 360/324.12, 324

(56) References Cited

U.S. PATENT DOCUMENTS

| | | | |
|---|---|---|---|
| 5,729,410 A | 3/1998 | Fontana, Jr. et al. | 360/324.2 |
| 5,898,547 A | 4/1999 | Fontana, Jr. et al. | 360/324.2 |
| 5,898,548 A | 4/1999 | Dill et al. | 360/324.2 |
| 5,901,018 A | 5/1999 | Fontana, Jr. et al. | 360/324.2 |
| 5,905,611 A * | 5/1999 | Yoda et al. | 360/324.1 |
| 5,909,344 A * | 6/1999 | Gill | 257/110 |
| 5,930,087 A * | 7/1999 | Brug et al. | 360/126 |
| 5,995,339 A * | 11/1999 | Koshikawa et al. | 360/321 |
| 6,005,753 A * | 12/1999 | Fontana et al. | 360/324.2 |
| 6,226,149 B1 * | 5/2001 | Dill et al. | 29/603.14 |
| 6,469,879 B1 * | 10/2002 | Redon et al. | 360/324.2 |
| 6,519,124 B1 * | 2/2003 | Redon et al. | 360/324.2 |

FOREIGN PATENT DOCUMENTS

| | | |
|---|---|---|
| JP | 11-171869 A | 6/1999 |
| JP | 11-188472 A | 7/1999 |

* cited by examiner

Primary Examiner—Carl Whitehead, Jr.
Assistant Examiner—Jennifer M Dolan
(74) Attorney, Agent, or Firm—Oliff & Berridge, PLC

(57) ABSTRACT

A ferromagnetic tunnel effective film has a free layer, and a pinned layer and a tunnel barrier layer sandwiched between the free layer and the pinned layer. A bias magnetic field-inductive layer applies a given magnetic field to the free layer, and has its larger width than that of the ferromagnetic tunnel effective film in the bias magnetic field direction. A flux guide layer is stacked with the bias magnetic field-inductive layer, and magnetically combined with the free layer. One end of the flux guide layer constitutes a flux probe portion having its smaller width than that of the bias magnetic field-inductive layer and projecting from the ends of the bias magnetic field-inductive layer.

15 Claims, 24 Drawing Sheets

TUNNEL MAGNETORESISTIVE EFFECTIVE ELEMENT, A THIN FILM MAGNETIC HEAD, A MAGNETIC HEAD DEVICE AND A MAGNETIC DISK DRIVE DEVICE

BACKGROUND OF THE INVENTION

1. Field of the Invention

This invention relates to a tunnel magnetoresistive effective element (hereinafter, often called as a "TMR element"), a thin film magnetic head, a magnetic head device and a magnetic disk drive device.

2. Related Art Statement

With the development of the recording density in hard disks (HDDs), it is required to enhance the sensitivity and the output power in the HDDs. Recently, attention is paid to TMR elements to satisfy the above requirements in the HDDs. The TMR element has a ferromagnetic tunnel film with a multilayered structure of a ferromagnetic layer/a tunnel barrier layer/a ferromagnetic layer. The ferromagnetic tunnel effective film is defined as the change of the tunnel current in the tunnel barrier layer depending on the relative angle between both of the ferromagnetic layers when flowing a current in between the ferromagnetic layers. In this case, the tunnel barrier layer is composed of such a thin insulating film that electrons can penetrate through the tunnel barrier layer with maintaining their spin conditions.

It is reported that the TMR element has a large resistance change ratio Δ R/R of 12% and over. Then, the TMR elements are expected as next generation sensors to substitute for spin valve film (hereinafter, called as a "SV film") elements, but they have been just applied for magnetic heads, so that as of now, it is required to take advantage of the TMR elements in the magnetic heads. That is, it is required to design a new magnetic head structure which is not proposed in the past because in using the ferromagnetic tunnel effective film of the TMR element, a current is flown in the stacking direction thereof.

U.S. Pat. Nos. 5,729,410, 5,898,547, 5,898,548 and 5,901,018 disclose conventional magnetic head structures using the TMR elements which are improved in order to realize their super high density recording. However, the requirement for the super high density recording in the TMR magnetic heads are increased, and recently, high-performance TMR magnetic heads are desired.

For example, in using the TMR element as a reading element of a thin film magnetic head, the tunnel barrier layer made of a thin insulating layer is exposed to a surface to be polished causes electric short circuit unfavorably in polishing step or after the polishing step. In order to remove the above matter, the inventors have proposed a flux-probe type TMR structure (Japanese Patent Application No. 11-188472), in which the ferro-magnetic tunnel effective film is arranged so as to recede the edge portion thereof from the surface to be polished, and the edge portion of the soft magnetic film directly connecting to the ferromagnetic tunnel film is drawn out, as a flux-probe portion, to the surface to be polished. In this way, the flux probe portion is made of the soft magnetic layer different from the ferro-magnetic tunnel effective film in size. Moreover, the flux-probe portion may be made of the part of the free layer of the ferromagnetic tunnel effective film.

The soft magnetic film to constitute the flux-probe portion also functions as a bias magnetic field-inductive portion to apply a longitudinal bias magnetic field from a hard magnet or an antiferromagnetic body to the free layer of the ferromagnetic magnetic tunnel effective film.

However, if the hard magnet or the like is contacted to the edge portion of the ferromagnetic tunnel effective film, an electric short circuit may occur between the ferromagnetic films due to the stacking structure thereof, so that the TMR change ratio is degraded.

On the contrary, if the hard magnet is contacted to either of the upper ferromagnetic film or the lower ferromagnetic film, the electric short circuit may not occur. However, a current is flown though the hard magnet, so that the TMR change ratio is degraded.

To avoid the above matter, the inventors have proposed the TMR structure in which the flux-probe is composed of a T-shaped soft magnetic film, and thus, the base portion of the flux-probe portion is elongated in a track width direction and has wider than the ferromagnetic tunnel effective film, and the hard magnet or the antiferromagnetic layer is formed at the both edges of the ferromagnetic tunnel effective film (Japanese Patent Application No. 11-171869).

Meanwhile, magnetic recording patterns in magnetic media are reduced with the development of the recording density and thus, it is required to reduce the size of the TMR element to be mounted on a reproducing head. For example, in order to realize a recording density of 40 Gbspi, the TMR element should be reduced to the size of about 0.4×0.4 ($\mu m^2$). Such a minute TMR element can be made by patterning a metal film by ion milling with using a minute mask made by photolithography.

As mentioned above, however, if the flux-probe and the bias magnetic field-inductive portion are made of one soft magnetic film, the corner portion of the flux-probe is made round by the photolithography technique as the TMR element is milled to be miniaturized. In the case of using the TMR element as a reading element of a thin film magnetic element, since the reproducing track width is defined by the flux-probe width, the rounded corner portion of the flux-probe may cause the fluctuation in the track width unfavorably.

In order to avoid the above matter, EB exposing technique, etc. should be employed, but has very slow throughput and requires an expensive apparatus.

Moreover, the TMR element may be made of a rectangular soft magnetic film larger than the TMR element, instead of the above T-shaped soft magnetic film, but in this case, it is impossible to reduce the track width to a smaller size than the TMR element.

SUMMARY OF THE INVENTION

It is an object of the present invention to provide a TMR element, a thin film magnetic head, a magnetic head device and a magnetic disk drive device which are applicable for super high density recording.

It is an also object of the present invention to provide a TMR element, a thin film magnetic head, a magnetic head device and a magnetic disk drive device which can have their respective high precise reading track widths.

To iron out the above matters, a TMR element according to the present invention includes a ferromagnetic tunnel effective film, a bias magnetic field-inductive layer and a flux guide layer.

The ferromagnetic tunnel effective film includes a tunnel barrier layer, a free layer and a pinned layer, and the tunnel barrier layer is sandwiched between the free layer and the pinned layer.

The bias magnetic field-inductive layer applies a given bias magnetic field to the free layer, and has its larger width than that of the ferromagnetic tunnel effective film.

The flux guide layer is stacked with the bias magnetic field-inductive layer so that the long direction of the flux guide layer is crossed to the bias magnetic field from the bias magnetic field-inductive layer, and magnetically combined to the free layer. One end of the flux guide layer constitutes a flux probe portion which has its smaller width than that of the bias magnetic field-inductive layer as viewed from the bias magnetic field direction and projects from the ends of the bias magnetic field-inductive layer.

The TMR element according to the present invention has a ferromagnetic tunnel effective film composed of a multi-layered structure of a free layer/a tunnel barrier layer/a pinned layer. Then, when a current is flown between the free layer and the pinned layer which sandwich the tunnel barrier layer, a tunnel current in the tunnel barrier layer changes, depending on a relative angle in the magnetizations of the free layer and the pinned layer (TMR effect). The magnetizations direction of the pinned layer is fixed, and the magnetization direction of the free layer changes on an external magnetic field. Therefore, when a current or a current change ratio in the TMR element is measured, the external magnetic field can be detected.

The TMR element according to the present invention includes a bias magnetic field-inductive layer to apply a given magnetic field to the free layer. Therefore, Barkhausen noise is removed in the free layer and thus, high quality detection signal can be obtained. Moreover, the bias magnetic field-inductive layer is wider than the ferromagnetic tunnel effective film in its long direction. Therefore, the bias magnetic field-inductive layer can have bias means on both ends thereof in the long direction, separated from the ferromagnetic tunnel effective film by a given distance. Therefore, electric short circuit due to the bias means can be prevented in the ferromagnetic tunnel effective film.

Moreover, the TMR element according to the present invention includes a flux guide layer. The flux guide layer is magnetically combined with the free layer, and one end of the flux guide layer constitutes a flux probe portion projecting from the ends of the bias magnetic field-inductive layer. The external magnetic field is introduced from the flux probe portion and applied to the free layer through the flux guide layer. Therefore, in building the TMR element in a thin film magnetic head, the flux probe portion can be positioned at a surface to be polished, and the ferromagnetic tunnel effective film can be receded from the surface. Therefore, during polishing or after polishing, an electric short circuit can not be caused in the tunnel barrier layer.

The flux probe portion has a narrower width than that of the bias magnetic field-inductive layer in the bias magnetic field direction, and is projecting from the ends of the bias magnetic field-inductive layer. Therefore, when the TMR element is employed as a reading element of a thin film magnetic head, the reproducing track width of the magnetic head is defined by the narrow width of the flux probe portion.

Moreover, since the flux guide layer is separated from the bias magnetic field-inductive layer, it may be formed by another manufacturing process different from the one for the bias magnetic field-inductive layer.

The long direction of the flux guide layer is crossed to the bias magnetic field direction of the bias magnetic field-inductive layer, and the one end of the flux guide layer constitutes the flux probe portion. Therefore, even though a corner portion of the flux guide layer is etched and thus, made round, the rounded corner may be removed and then, the not etched center portion of the flux guide layer can be employed as the flux probe portion. As a result, the TMR element having precise reading track width can be provided.

In the above ferromagnetic effective film, the free layer, the tunnel barrier layer and the pinned layer are stacked in turn, or the pinned layer, the tunnel barrier layer and the free layer are stacked in turn.

In the case that the free layer, the tunnel barrier layer and the pinned layer are stacked in turn, the flux guide layer may be stacked on the bias magnetic field-inductive layer, and the free layer may be adjacent to the flux guide layer. In this case, the flux guide layer may be integrated with the free layer.

In the case that the pinned layer, the tunnel barrier layer and the free layer are stacked in turn, the bias magnetic field-inductive layer may be adjacent to the free layer, and the flux guide layer may be stacked on the bias magnetic field-inductive layer.

The bias magnetic field-inductive layer has the bias means which are contacted to both ends of the bias magnetic field-inductive layer in the width direction and separated from both ends of the pinned layer by a give distance. Therefore, electric short circuit between ferromagnetic layers constituting the ferromagnetic tunnel effective film can be prevented, and current flow for the bias means can be also prevented.

This invention relates to an electrode structure to flow a current in the ferromagnetic tunnel effective film and a shielding structure for the ferromagnetic tunnel effective film. Moreover, this invention also relates to a thin film magnetic head including the TMR element as a reading element, a thin film magnetic head device and a magnetic disk drive device which include the thin film magnetic head. Furthermore, this invention relates to a method for manufacturing a ferromagnetic tunnel effective film.

BRIEF DESCRIPTION OF THE DRAWINGS

For a better understanding of this invention, reference is made to the attached drawings, wherein.

DETAILED DESCRIPTION OF PREFERRED EMBODIMENTS

Figure 1:
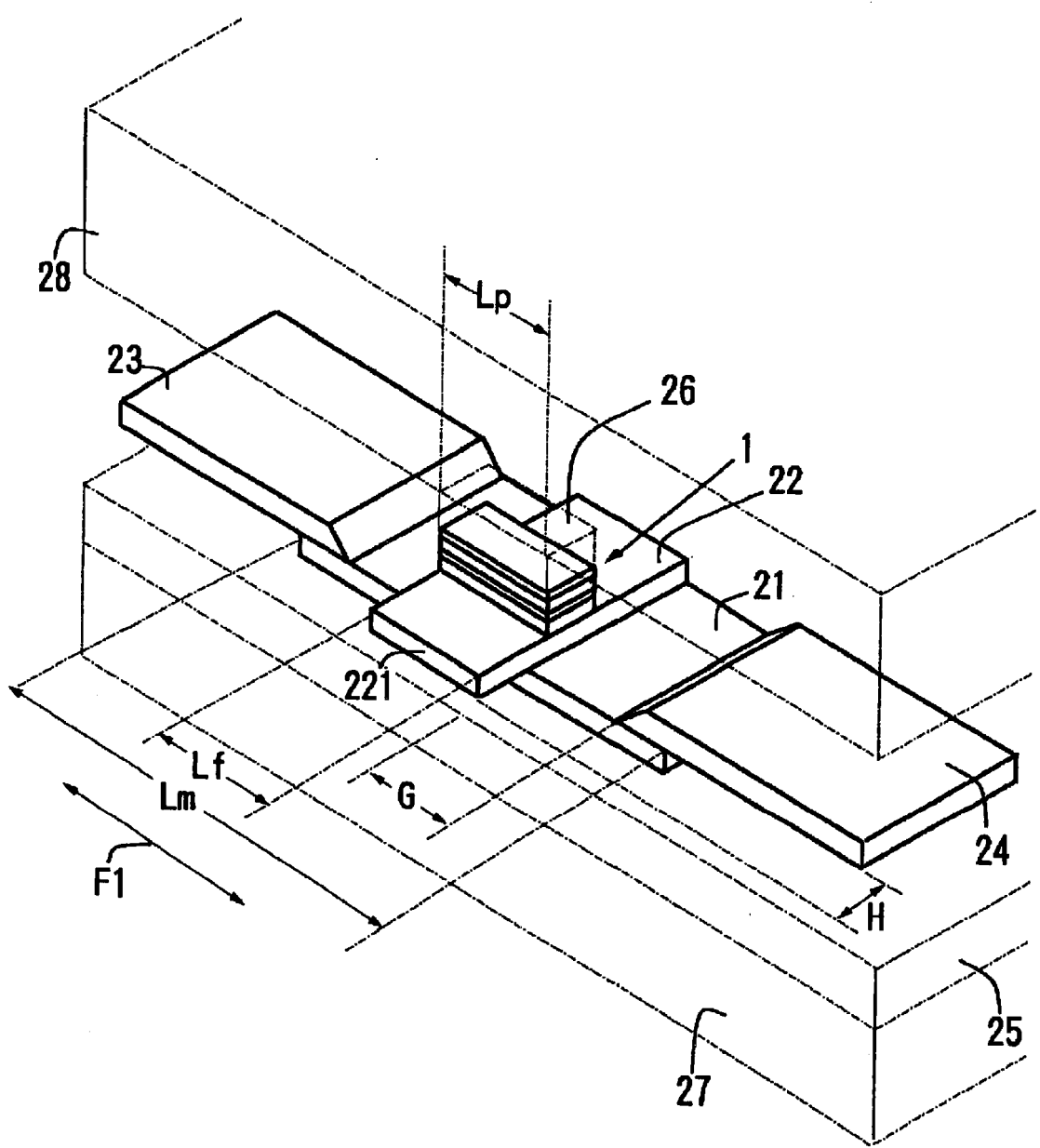
FIG. 1 is a perspective view showing a TMR element according to the present invention.
Figure 2:
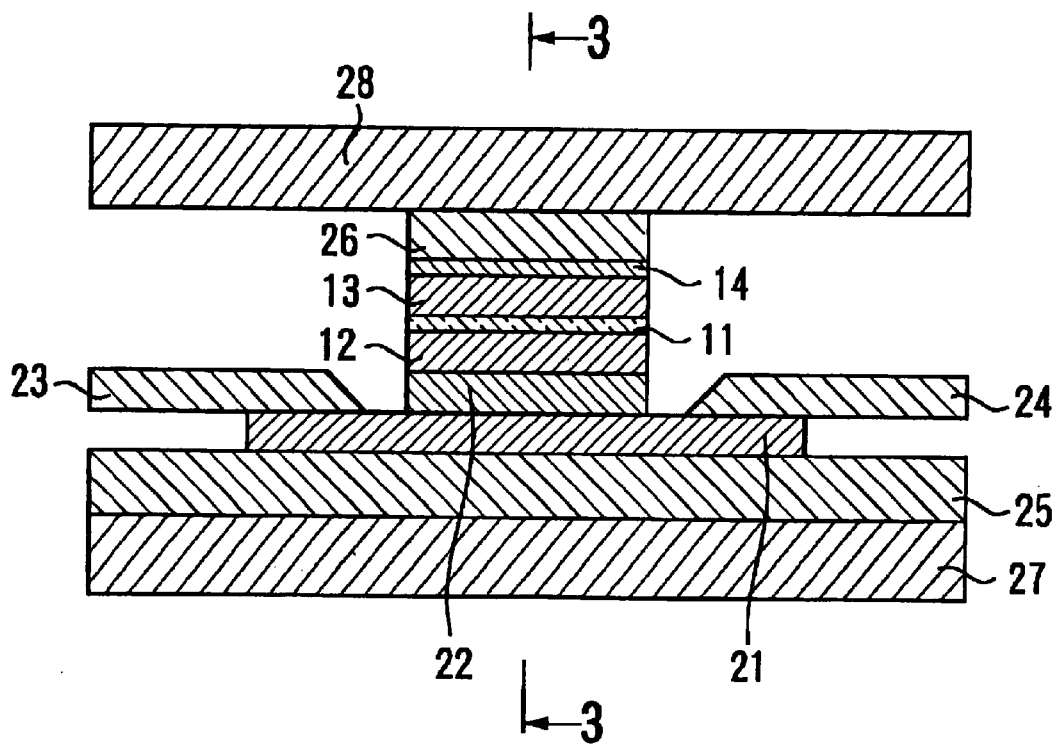
FIG. 2 is an enlarged cross sectional view of the TMR element shown in FIG. 1.
Figure 3:
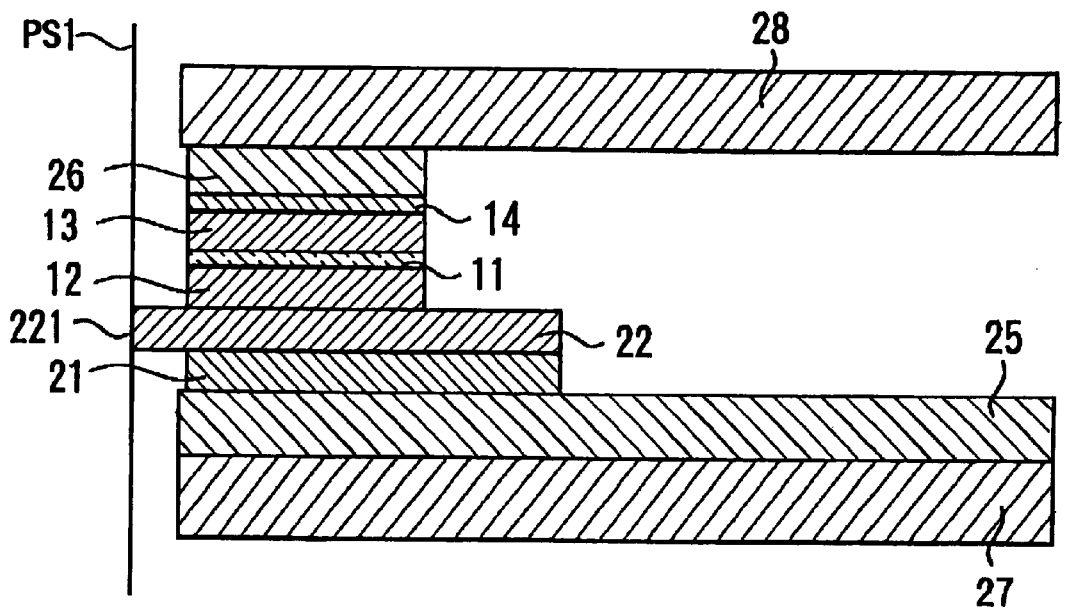
FIG. 3 is a cross sectional view of the TMR element taken on line "3—3" in FIG. 2.

FIG. 1 is a perspective view showing a TMR element according to the present invention, and FIG. 2 is an enlarged cross sectional view of the TMR element shown in FIG. 1, and FIG. 3 is a cross sectional view of the TMR element taken on line "3—3" in FIG. 2. In these figures, some parts of the TMR element are exaggerated for the explicitness of the features of the TMR element of the present invention. The hatched parts are covered with a non-magnetic insulating layer made of a ceramic material.

The depicted TMR element includes a ferromagnetic tunnel effective film 1, a bias magnetic field-inductive layer 21 and a flux guide layer 22. The ferromagnetic tunnel effective film 1 includes a tunnel barrier layer 11, a free layer 12 and a pinned layer 13. The tunnel barrier layer 11 is sandwiched between the free layer 12 and the pinned layer 13.

The magnetization direction of the free layer 12 is fundamentally rotated on an external magnetic field as a magnetic information. Moreover, the magnetization direction of the pinned layer 13 is pinned so that it can be aligned in one direction. Therefore, a pinning layer 14 to pin the magnetization direction of the pinned layer 13 is provided on a surface of the pinned layer 13 opposite to a surface on which the tunnel barrier layer 11 is formed.

The bias magnetic field-inductive layer 21 applies a bias magnetic field to the free layer 12, and is wider than the ferromagnetic tunnel effective film 1 as viewed from a bias magnetic field F1. Then, the bias magnetic field-inductive layer 21 has bias means 23 and 24. As a result, the bias magnetic field is applied to the free layer 12 from the bias means 23 and 24 via the bias magnetic field-inductive layer 21. The bias means is made of a high coercive force material, an antiferromagnetic material or a laminated body composed of an antiferromagnetic layer and at least one ferromagnetic layer.

The flux guide layer 22 is stacked on the bias magnetic field-inductive layer 21 so that the longitudinal direction of the flux guide layer 22 can be almost orthogonal to the bias direction F of the bias magnetic field-inductive layer 21. The flux guide layer 22 is magnetically connected to the free layer 12, and one end of the flux guide layer 22 constitutes a flux probe portion 221 which is narrower than the bias magnetic field-inductive layer 21 and is projected from the ends of the bias magnetic field-inductive layer 21.

In the ferromagnetic tunnel effective film 1, the free layer 12, the tunnel barrier layer 11 and the pinned layer 13 are stacked in turn. The flux guide layer 22 is directly stacked on the bias magnetic field-inductive layer 21. The free layer 12 is provided on a surface of the flux guide layer 22.

The TMR element of the present invention, as mentioned above, has the ferromagnetic tunnel effective film 1 composed of the multilayered structure of the free layer 12/the tunnel barrier layer 11/the pinned layer 13. Therefore, when a current is flown between the free layer 12 and the pinned layer 13 via the tunnel barrier layer 11, a tunnel current in the tunnel barrier layer 11 changes depending on the relative angle in the magnetizations of the free layer 12 and the pinned layer 13. Although the magnetization direction of the pinned layer 13 is fixed, the magnetization direction of the free layer 12 changes on an external magnetic field. Therefore, if a current or a current change rate in the TMR element is measured, the external magnetic field can be detected.

Since the TMR element includes the bias magnetic field-inductive layer 21 to apply the bias magnetic field to the free layer 12, it can remove Barkhausen noise in the free layer 12 and obtain high quality detection signal. Since the bias magnetic field-inductive layer 21 is wider than the ferromagnetic tunnel effective film 1 as viewed from the bias magnetic field direction F1, it can have the bias means 23 and 24 on both edges thereof separating from the ferromagnetic tunnel effective film 1 by the distance G. Therefore, the bias means can not cause electric short circuit between the free layer 12 and the pinned layer 13.

Moreover, the TMR element according to the present invention includes the flux guide layer 22 magnetically connected to the free layer 12, and one end of the flux guide layer 22 constitutes a flux probe portion 221 projecting from the ends of the bias magnetic field-inductive layer 21. The external magnetic field is introduced from the flux probe portion 221 and applied to the free layer 12 through the flux guide layer 22. Therefore, in building the TMR element in a thin film magnetic head, the flux probe portion 221 can be positioned at a surface to be polished PS1 (see, FIG. 3), and the ferromagnetic tunnel effective film 1 can be receded from the surface PS1. Therefore, during polishing or after polishing, an electric short circuit can not be caused in the tunnel barrier layer 11.

The flux probe portion 221 has a narrower width Lf than the width Lm of the bias magnetic field-inductive layer 21, and is projecting from the ends of the bias magnetic field-inductive layer 21. Therefore, when the TMR element is employed as a reading element of a thin film magnetic head, the reproducing track width of the magnetic head is defined by the narrow width Lf of the flux probe portion 221.

Moreover, since the flux guide layer 22 is separated from the bias magnetic field-inductive layer 21, it may be formed by different process from the one for the bias magnetic field-inductive layer 21. The longitudinal direction of the flux guide layer 22 is crossed to the bias magnetic field direction F1 of the bias magnetic field-inductive layer 21, and the one end of the flux guide layer 22 constitutes the flux probe portion 221. Therefore, even though a corner portion of the flux guide layer 22 is etched and thus, made round, the rounded corner may be removed and then, the not etched center portion of the flux guide layer 22 can be employed as the flux probe portion 221. As a result, the TMR element having precise reading track width can be provided.

The width Lp of the ferromagnetic tunnel effective film 1 is equal to or larger than the width Lf of the flux probe portion 221 and smaller than the width Lm of the bias magnetic field-inductive layer 21. The width Lm of the bias magnetic field-inductive layer 21 is set within 0.5–4 $\mu$m, and the width Lf of the flux probe portion 221 is set within 0.1–2 $\mu$m.

The projecting length H of the flux guide layer 22 is set within 0.01–0.3 $\mu$m, preferably within 0.01–0.2 $\mu$m, more preferably 0.01–0.1 $\mu$m. Although it is desired that the projecting length H is diminished up to zero, electrostatic destruction may occur and electric short circuit may occur in polishing process as the projecting length H is diminished. Therefore, the lower limited value of the projecting length H is preferably set to 0.01 $\mu$m. If the lower limited value of the projecting length H is set beyond 0.3 $\mu$m, the output power of the TMR element may be decreased and Barkhausen noise may occur in the TMR element due to the insufficient bias magnetic field in the bias magnetic field direction F1.

A pair of electrodes 25 and 26 to supply a sense current to the ferromagnetic tunnel effective film 1 are provided on both surfaces of the ferromagnetic tunnel effective film 1, respectively. Then, a pair of magnetic shielding layers 27 and 28 are arranged to cover the electrodes 25 and 26, respectively.

The bias means 23 and 24 of the bias magnetic field-inductive layer 21 generates a given bias magnetic field in the bias magnetic field direction F1. The width Lm of the bias magnetic field-inductive layer 21 is set to be larger than the width Lp of the pinned layer 13, the bias magnetic field-inductive layer 21 has elongated portions on their both edges due to the difference in the widths Lm and Lp between the bias magnetic field-inductive layer 21 and the pinned layer 13.

It is desired that the distance G is set within a given range so as not to degrade the TMR change ratio substantially. Concretely, it is desired that the distance G is set to 0.02 $\mu$m and over, particularly to within 0.02–0.3 $\mu$m, more particularly to 0.02 $\mu$m and over and less than 0.15 $\mu$m.

If the distance G is set to less than 0.02 $\mu$m, the TMR change ratio may be degraded. On the other hand, if the distance G is set beyond 0.3 $\mu$m, effective track width is widened and thus, the high density recording may not be realized.

Not particularly, it is desired that the thickness of the free layer 12 is set to 2–50 nm, particularly 4–30 nm, more particularly 6–20 nm. If the thickness of the free layer 12 is set to less than 2 nm, the free layer may not be formed by a well known film-forming method so as to have sufficient large width Lf. Moreover, the magnetic properties of the ferromagnetic tunnel effective film 1 become unstable, resulting in the increase of the operation noise of a thin film magnetic head including the TMR element.

If the thickness of the free layer 12 is set to more than 50 nm, the electron spin polarization in the free layer 12 is dispersed due to the property fluctuation of the free layer 12 and thus, the TMR change ratio may be degraded. Moreover, the output power of the TMR element may be decreased.

It is desired that the free layer 12 and the pinned layer 13 are made of a high spin polarization material such as Fe, Co, Ni, FeCo, NiFe, CoZrNb, FeCoNi so as to gain a large TMR change ratio. The free layer 12 and the pinned layer 13 may be composed of a laminated body including two or more layers. It is desired that the thickness of the pinned layer 13 is set to within 1–10 nm, particularly within 2–5 nm. If the thickness of the pinned layer 13 is set beyond 10 nm, the pinning effect of the pinning layer 14 is weakened, and if the thickness of the pinned layer 13 is set less than 1 nm, the TMR change ratio may be degraded.

The pinning layer 14 may be made of any material only if the pinning layer 14 can pin the magnetization direction of the pinned layer 13. Normally, the pinning layer 14 is made, in a thickness of 60–5 nm of an antiferromagnetic material.

The tunnel barrier layer 11 may be made of $Al_2O_3$, NiO, GdO, MgO, $Ta_2O_5$, $MoO_2$, $TiO_2$, $WO_2$, etc. It is desired that the tunnel barrier layer 11 is formed as thin as possible in order to reduce the resistance of the TMR element. However, if the tunnel barrier 11 is formed too thin, much pin hole may be formed therein, causing a leak current. As a result, the thickness of the tunnel barrier layer 11 is set to within 0.5–2 nm.

In a preferred embodiment of the present invention, the free layer 12 may be composed of a synthetic ferrimagnet made of a three-layered laminated body of a NiFe layer (2 nm thickness)/a Ru layer (0.7 nm thickness)/a NiFe layer (2.5 nm thickness). In this case, the magnetization directions of the upper NiFe layer and the lower NiFe layer are opposite each other. When the free layer 12 is composed of the synthetic ferrimagnet, the thickness of free layer 12 can be reduced and thus, the magnetic field sensitivity and the output power of the TMR element can be enhanced. Such a synthetic ferrimagnet may be employed for the pinned layer 13.

Although in the above embodiment, the bias means 23 and 24 are provided on the upper surface of the free layer 12 at both ends thereof, they may be provided on the lower surface of the free layer 12.

Figure 4:
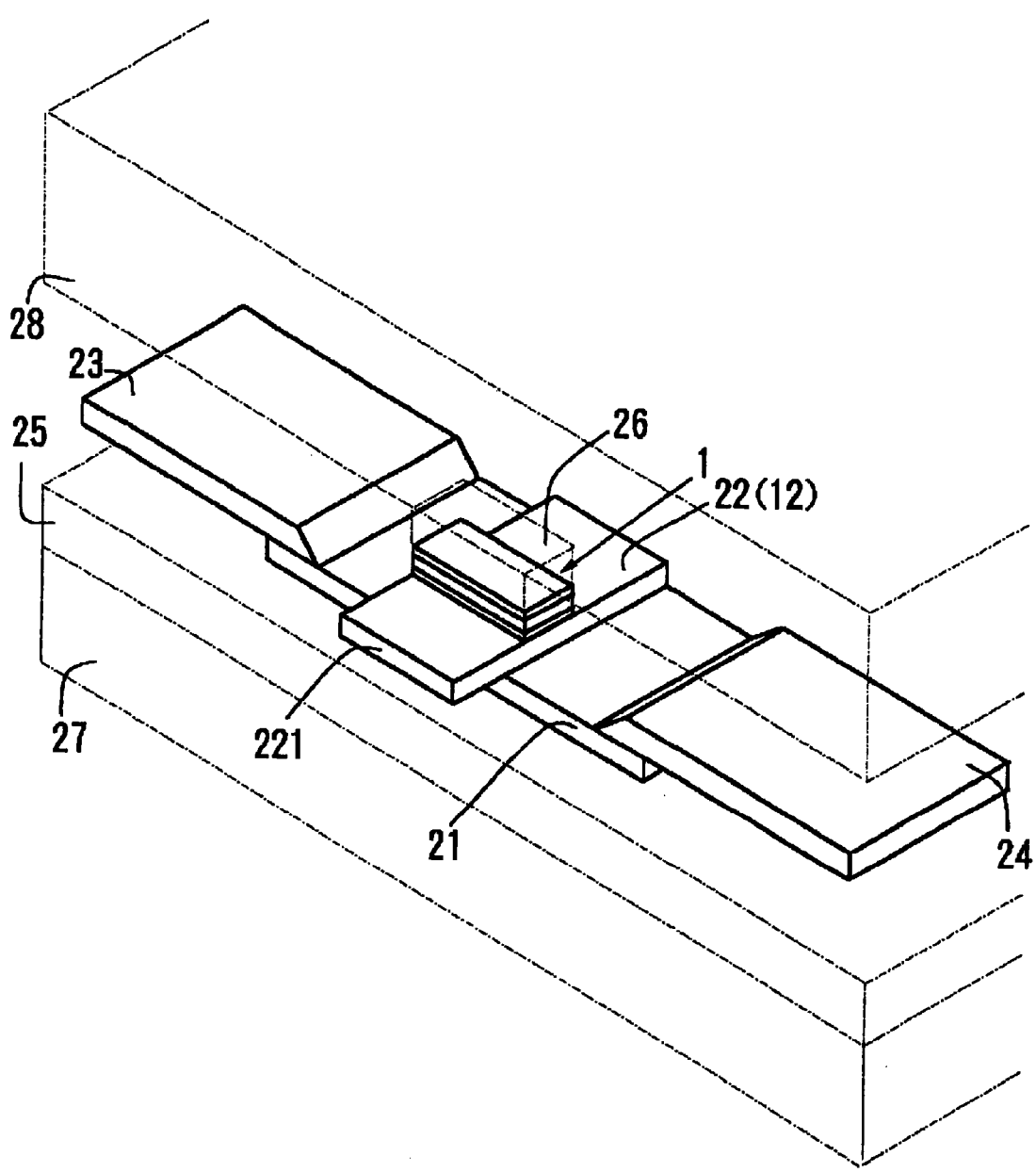
FIG. 4 is a perspective view showing another TMR element according to the present invention.
Figure 5:
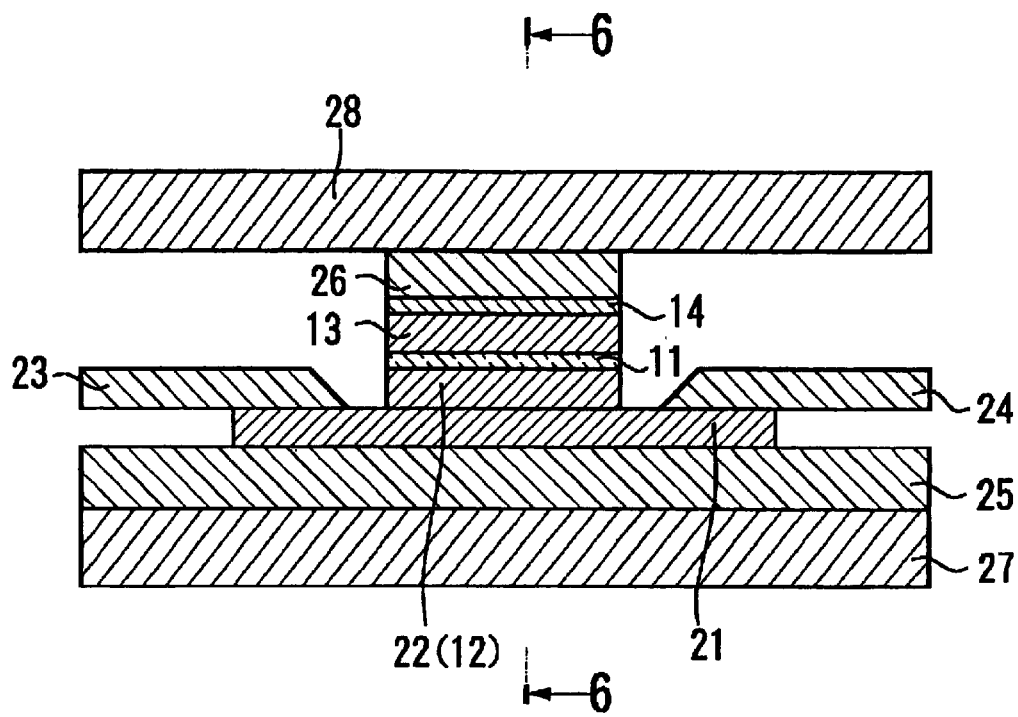
FIG. 5 is an enlarged cross sectional view of the TMR element shown in FIG. 4.
Figure 6:
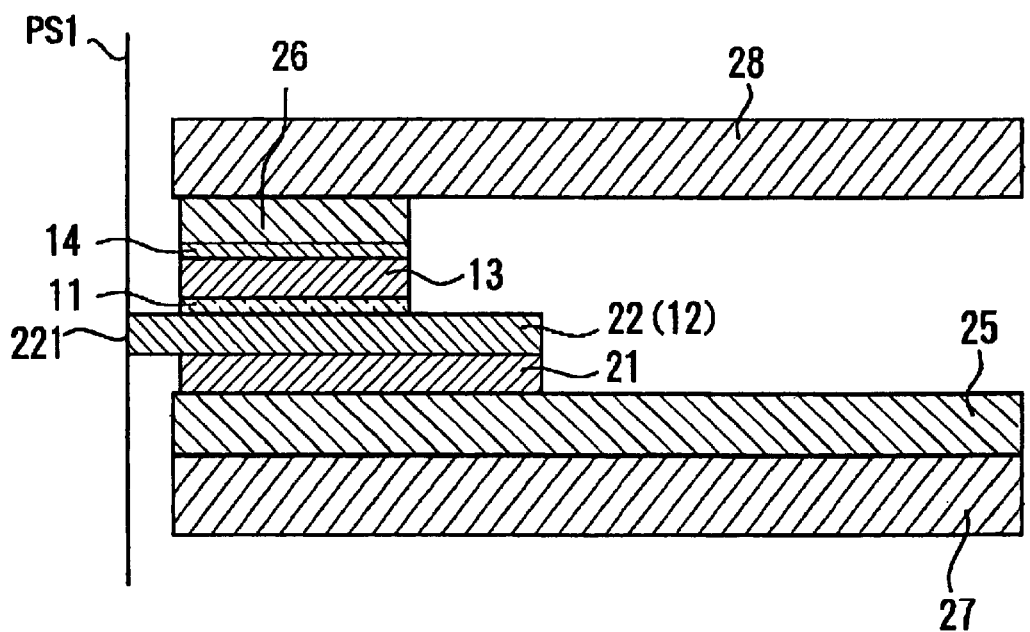
FIG. 6 is a cross sectional view of the TMR element taken on line "6—6" in FIG. 5.

FIG. 4 is a perspective view showing another TMR element according to the present invention, and FIG. 5 is an enlarged cross sectional view of the TMR element shown in FIG. 4, and FIG. 6 is a cross sectional view of the TMR element taken on line "6—6" in FIG. 5. In these figures, the same references are given to the similar parts to the ones shown in FIGS. 1–3. In a ferromagnetic tunnel effective film 1 of this TMR element, a free layer 12, a tunnel barrier layer 11 and a pinned layer 13 are stacked in turn. A flux guide layer 22 is formed on the bias magnetic field-inductive layer 21, integrated with the free layer 12 and separated from the bias magnetic field-inductive layer 21.

Figure 7:
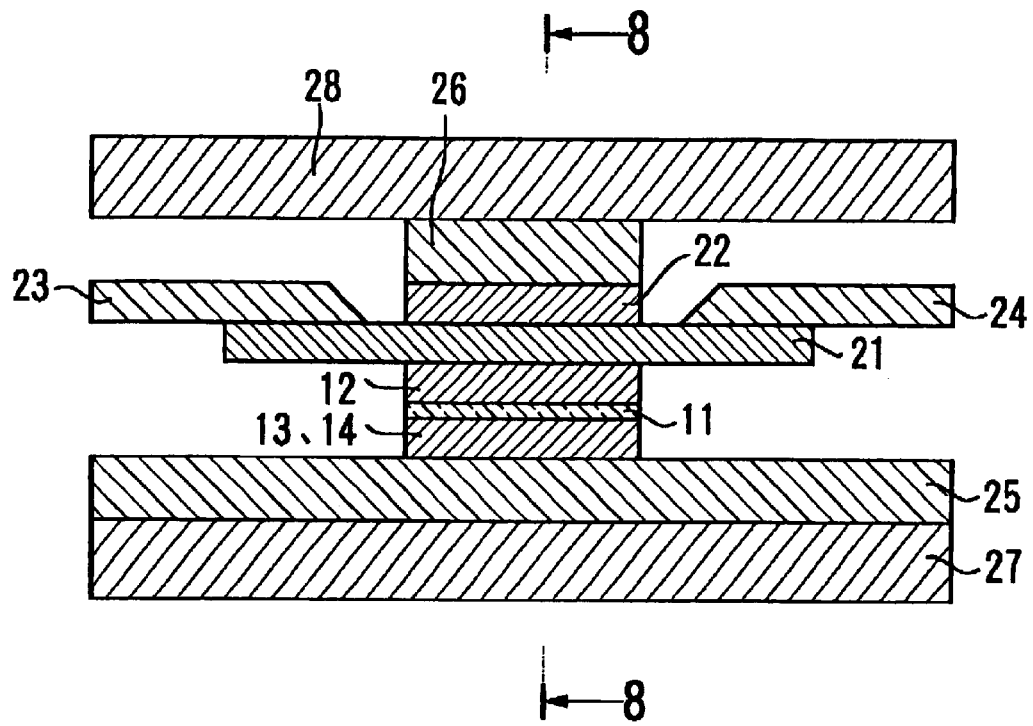
FIG. 7 is a perspective view showing still another TMR element according to the present invention.
Figure 8:
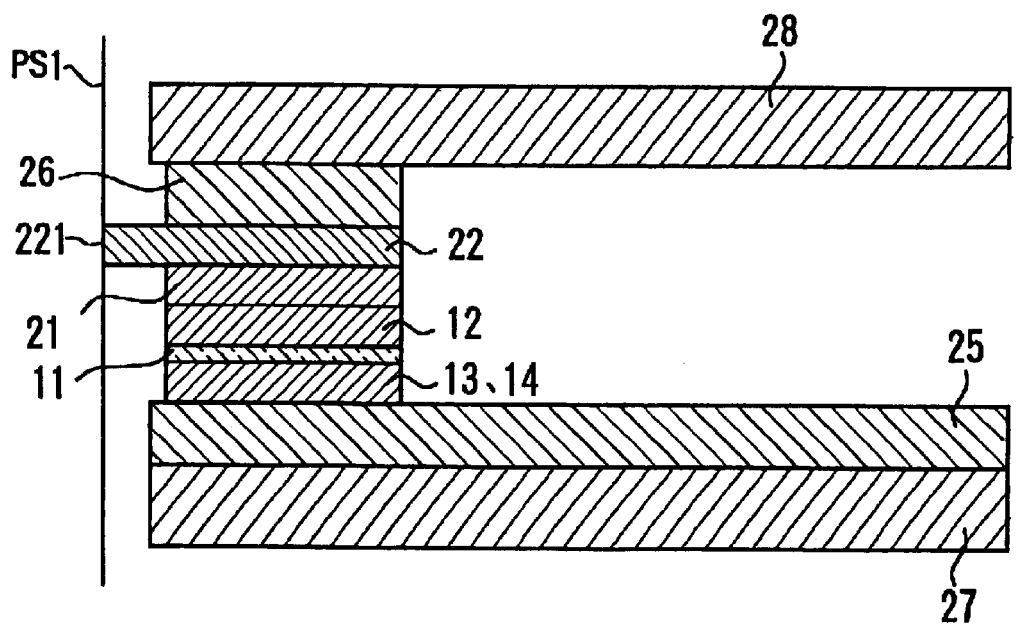
FIG. 8 is a cross sectional view of the TMR element taken on line "8—8" in FIG. 7.

FIG. 7 is a perspective view showing still another TMR element according to the present invention, and FIG. 8 is a cross sectional view of the TMR element taken on line "8—8" in FIG. 7. In these figures, the same references are given to the similar parts to the ones shown in FIGS. 1–3. In a ferromagnetic tunnel effective film 1 of this TMR element, a pinned layer 13, a tunnel barrier layer 11 and a free layer 12 are stacked in turn. A bias magnetic field-inductive layer 21 is adjacent to the free layer 12, and the flux guide layer 22 is stacked on a bias magnetic field-inductive layer 21.

Figure 9:
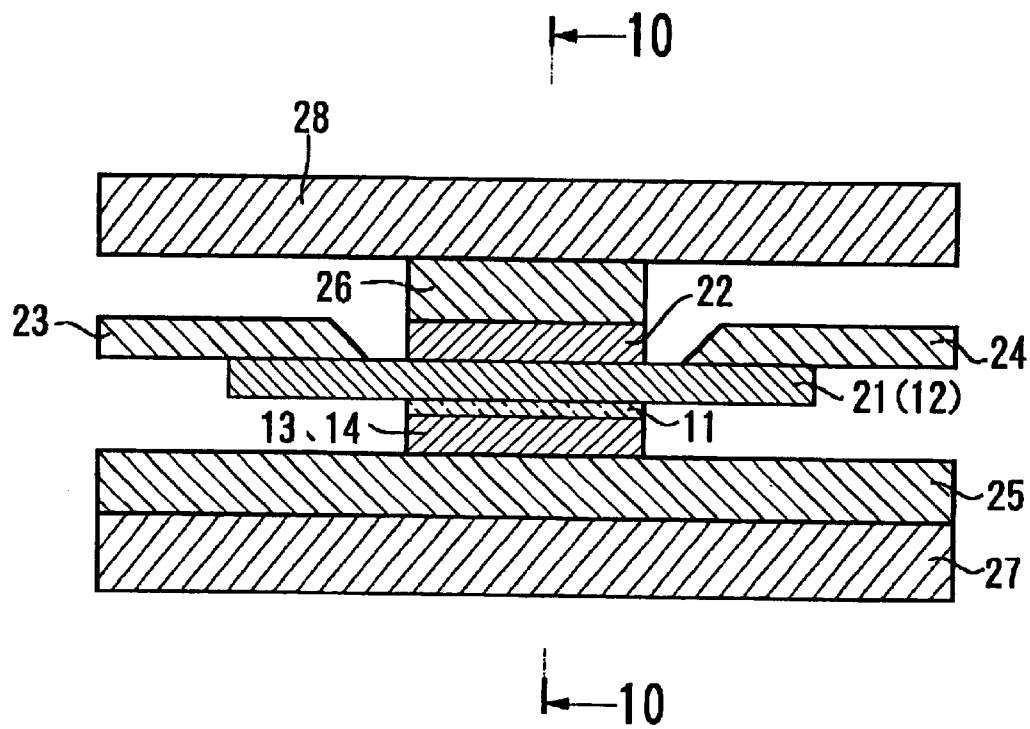
FIG. 9 is a perspective view showing a further TMR element according to the present invention.
Figure 10:
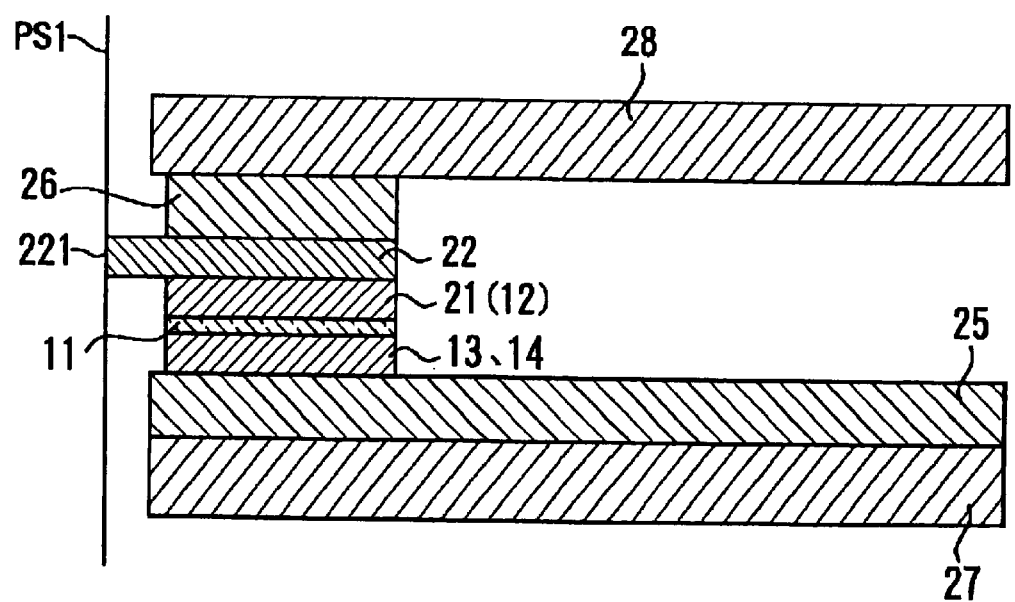
FIG. 10 is a cross sectional view of the TMR element taken on line "10—10" in FIG. 9.

FIG. 9 is a perspective view showing a further TMR element according to the present invention, and FIG. 10 is a cross sectional view of the TMR element taken on line "10—10" in FIG. 9. In these figures, the same references are given to the similar parts to the ones shown in FIGS. 1–3. In a ferromagnetic tunnel effective film 1 of this TMR element, a pinned layer 13, a tunnel barrier layer 11 and a free layer 12 are stacked in turn. A bias magnetic field-inductive layer 21 is integrated with the free layer 12. A flux guide layer 22 is provided on and separated from the bias magnetic field-inductive layer 21.

The manufacturing method of the TMR element shown in FIGS. 1–3 will be described with reference to FIGS. 11–23 hereinafter. Particularly, the manufacturing process of the bias magnetic field-inductive layer 21 and the flux guide layer 22. In the manufacturing process, well known various film-forming method such as a photoresist method, an ion milling method, a lift-off method and a sputtering method, etc. will be employed, but detail description for the film-forming method will be omitted.

Figure 11:
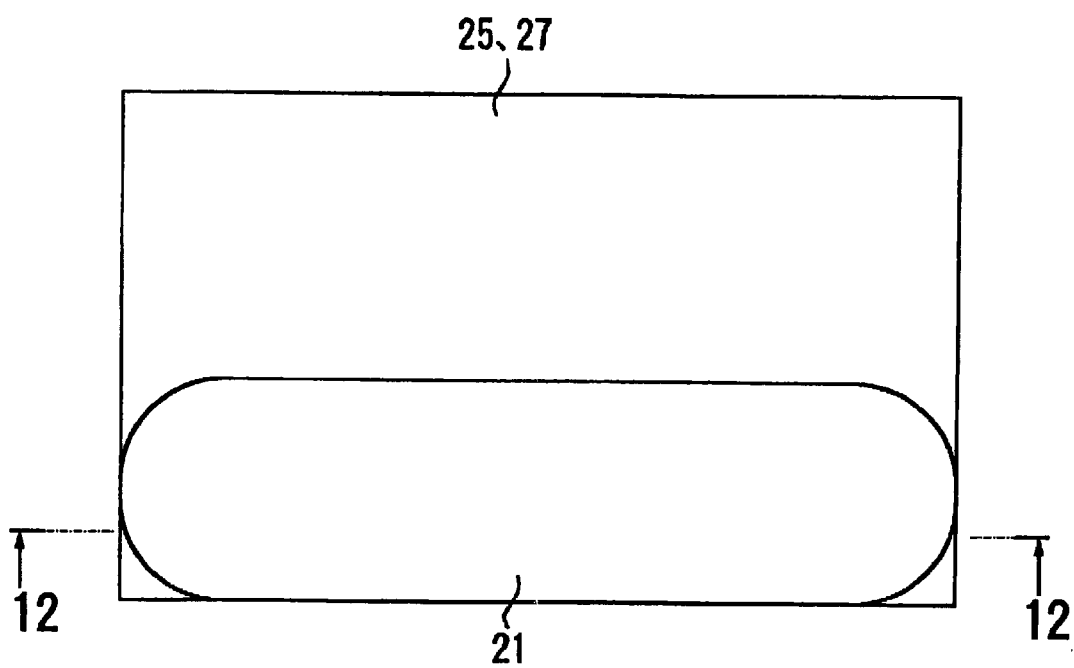
FIG. 11 is a manufacturing step view of the TMR element shown in FIGS. 1–3.
Figure 12:
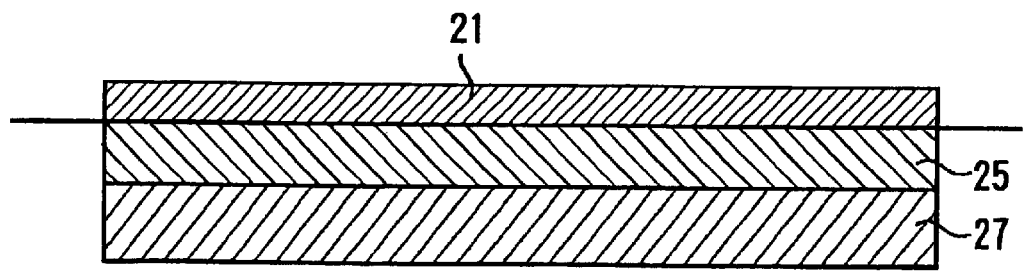
FIG. 12 is a cross sectional view of the manufacturing step view taken on line "12—12" in FIG. 11.

First of all, as shown in FIGS. 11 and 12, the bias magnetic field-inductive layer 21 is formed on the electrode layer 25 provided on a shielding layer 27. The shielding layer 27 and the electrode layer 25 are covered with a non-magnetic insulating layer made of a ceramic material.

Figure 13:
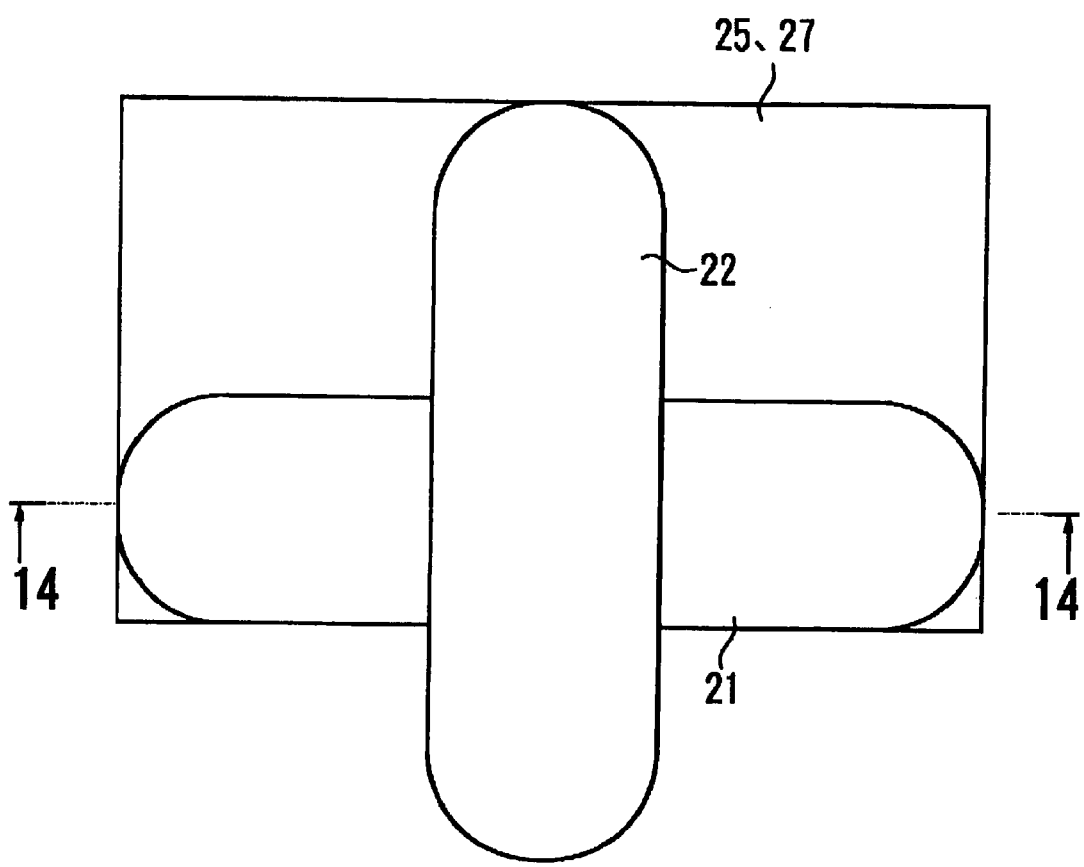
FIG. 13 is a manufacturing step view after the one shown in FIGS. 11 and 12.
Figure 14:
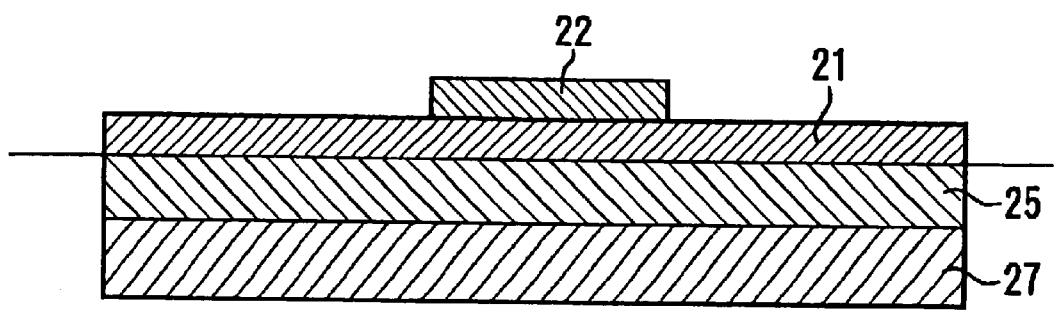
FIG. 14 is a cross sectional view of the manufacturing step view taken on line "14—14" in FIG. 13.

Next, as shown in FIGS. 13 and 14, the flux guide layer 22 is formed on the bias magnetic field-inductive layer 21. As mentioned above, in order to realize a high recording density of 40 Gbspi, it is required to reduce the size of the ferromagnetic tunnel effective film up to 0.4×0.4 ($\mu m^2$). Therefore, the size of the flux guide layer 22 is reduced in accordance with the size reduction of the ferromagnetic tunnel effective film. When the flux guide layer 22 is formed by photolithography technique, the corners of the flux guide layer 22 are made round as shown in FIG. 13.

Figure 15:
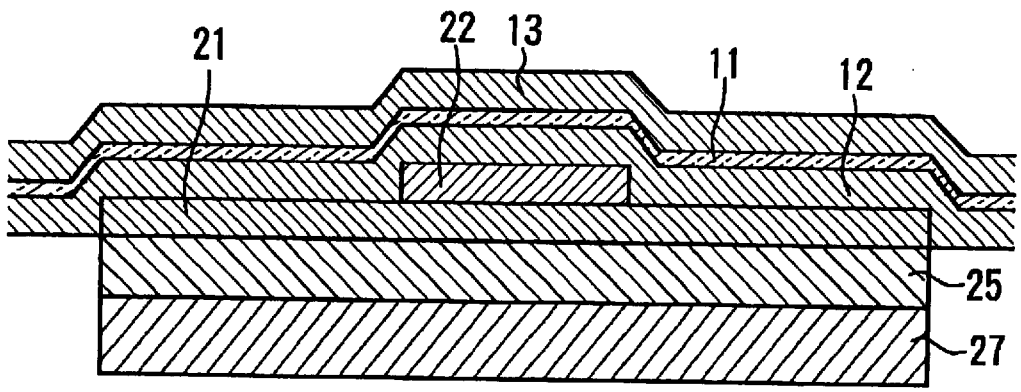
FIG. 15 is a cross sectional view showing a manufacturing step view after the one shown in FIGS. 13 and 14.

Subsequently, as shown in FIG. 15, a ferromagnetic layer 12 to constitute the free layer, an insulating layer 11 to constitute the tunnel barrier layer and another ferromagnetic layer 13 to constitute the pinned layer are formed on the bias magnetic field-inductive layer 21 and the flux guide layer 22. In this case, it is desired that the surface of each layer is cleaned by ion etching before forming the above layers 11–14. The surface cleaning enables a resist remaining contaminated layer or an oxide layer from being formed at the boundary between the adjacent layers, and thus, the increase of the resistance of the ferromagnetic tunnel effective film can be repressed.

Figure 16:
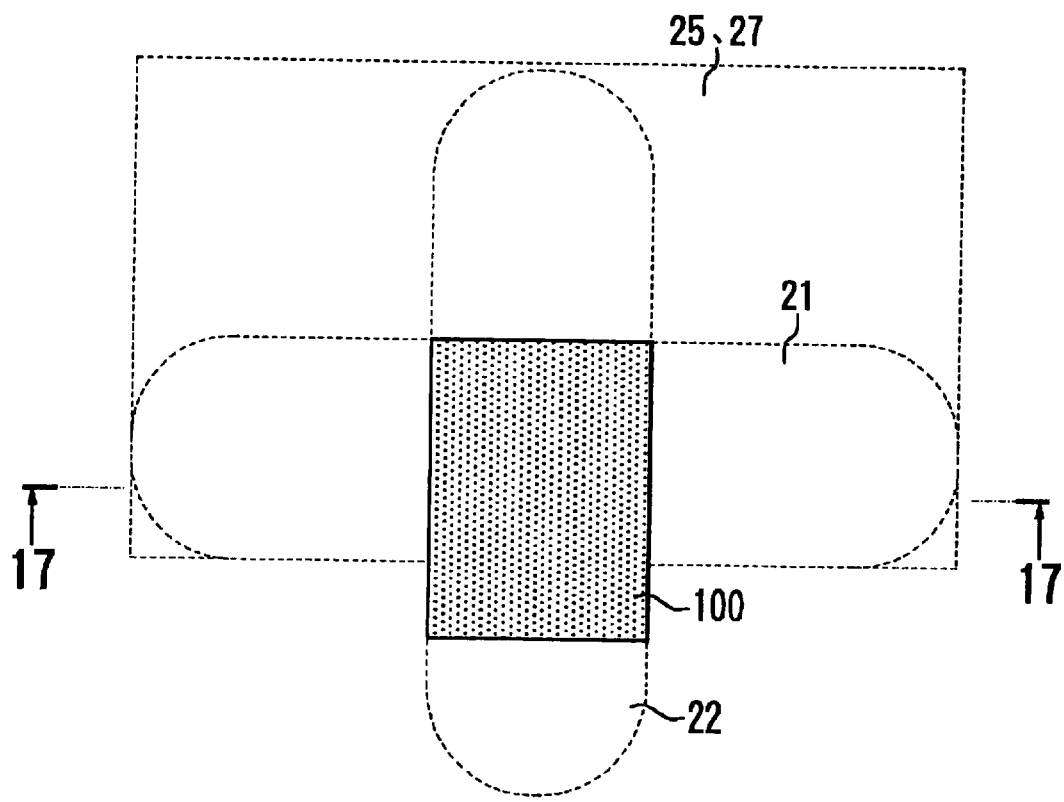
FIG. 16 is a manufacturing step view after the one shown in FIG. 15.

Then, as shown in FIG. 16, a resist film 100 is formed in a given pattern on the ferromagnetic layer 13. The resist film 100 is elongated from the overlapping area between the bias magnetic field-inductive layer 21 and the flux guide layer 22 to the top area of the flux guide layer 22.

Figure 17:
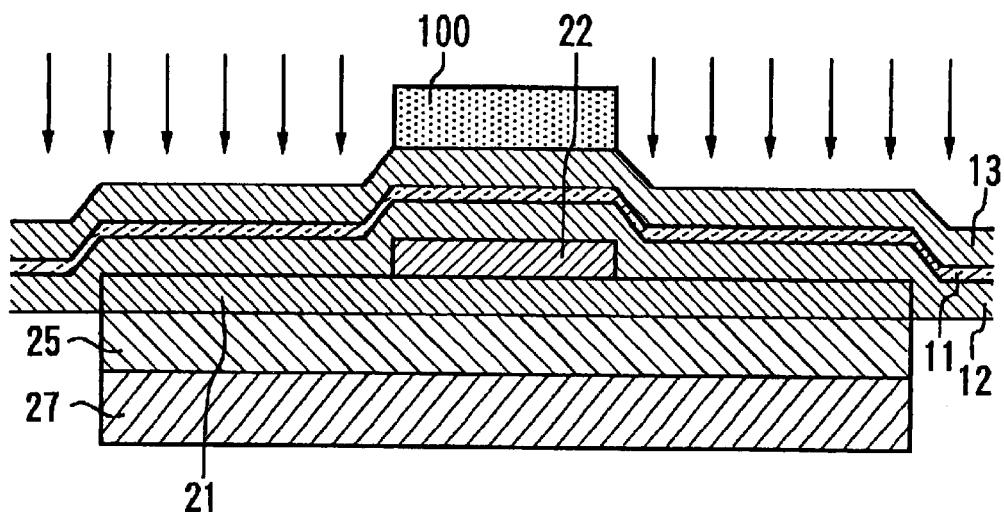
FIG. 17 is a cross sectional view of the manufacturing step view taken on line "17—17" in FIG. 16.
Figure 18:
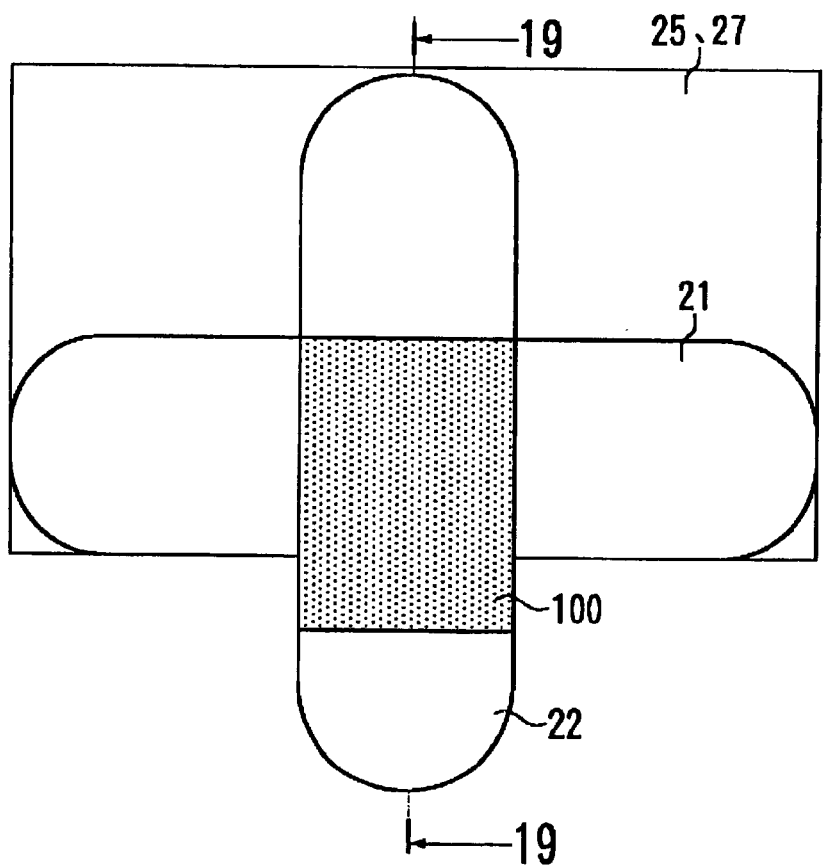
FIG. 18 is a manufacturing step view after the one shown in FIGS. 16 and 17.
Figure 19:
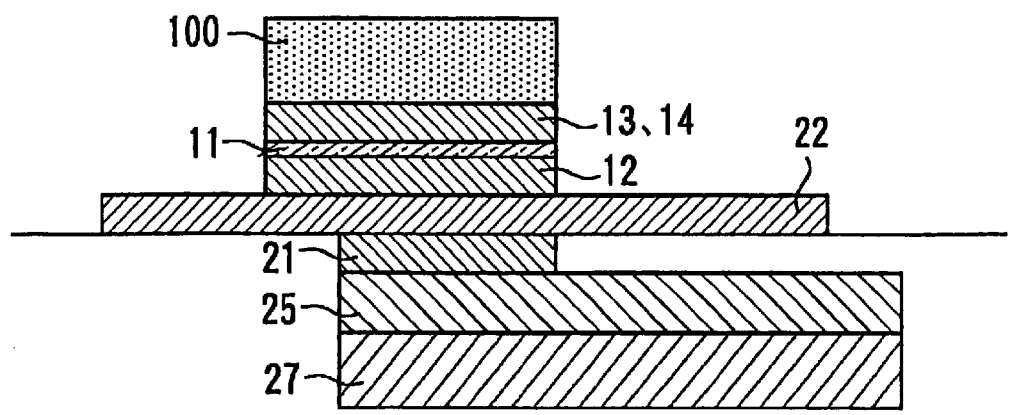
FIG. 19 is a cross sectional view of the manufacturing step view taken on line "19—19" in FIG. 18.

Then, as shown in FIG. 17, the uncovered areas of the ferromagnetic layers 12 and 13 and the insulating layer 11 with the resist film 100 are removed by ion milling etc., and as shown in FIGS. 18 and 19, the ferromagnetic layers 12 and 13 and the insulating layer 11 are patterned to form a laminated body having the same pattern as that of the resist film 100.

Figure 20:
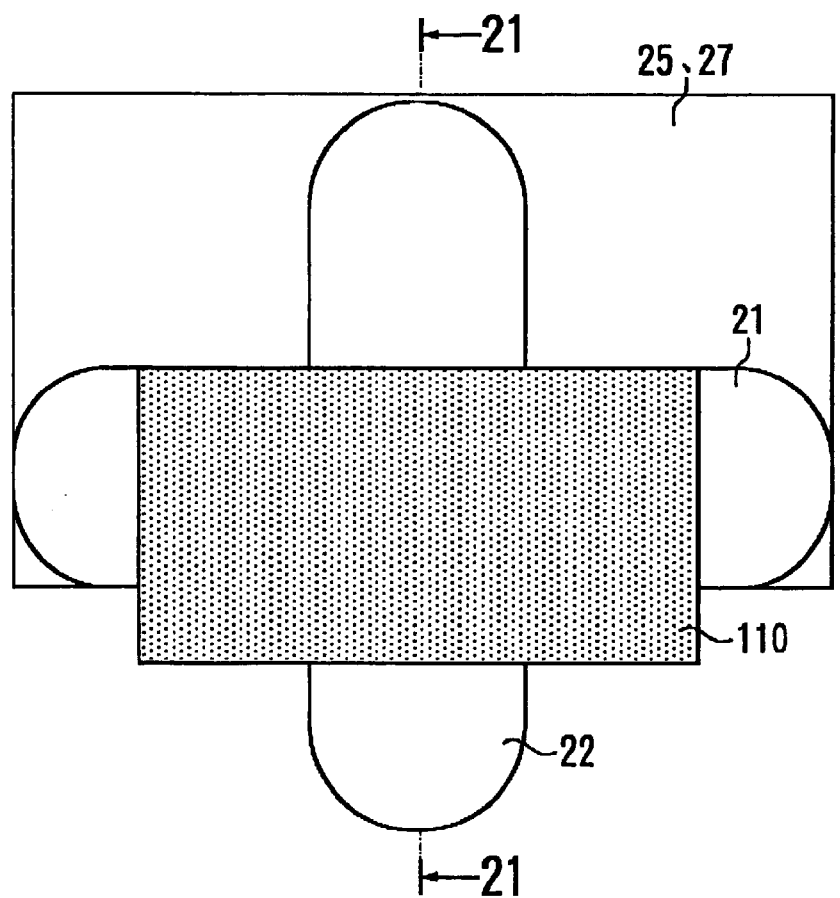
FIG. 20 is a manufacturing step view after the one shown in FIGS. 18 and 19.
Figure 21:
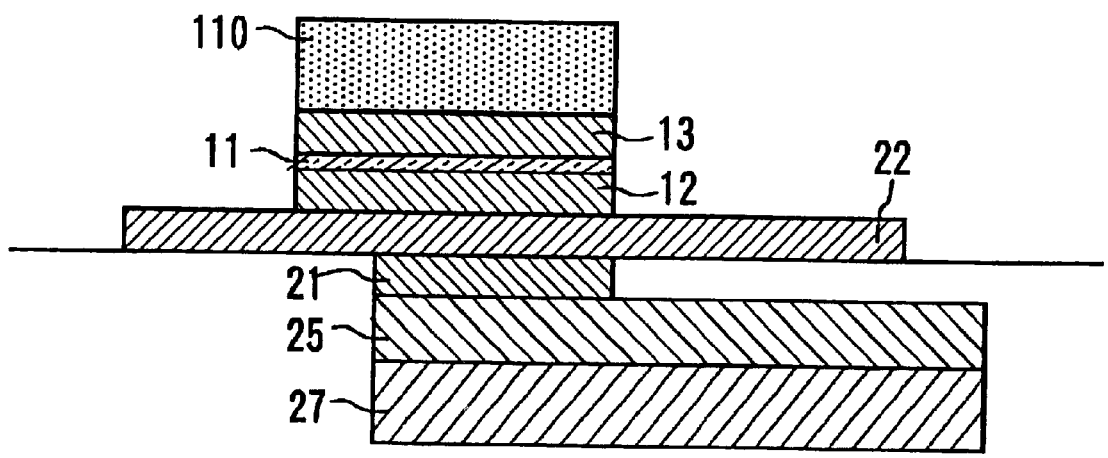
FIG. 21 is a cross sectional view of the manufacturing step view taken on line "21—21" in FIG. 20.

Subsequently, the resist film 100 is peeled off by a well known means, and as shown in FIG. 20, another resist film 110 is formed in a given pattern so as to expose both of the rounded forefronts of the bias magnetic field-inductive layer 21 and the both of the rounded forefronts of the flux probe film 22. Then, as shown in FIG. 21, the rounded forefronts of the bias magnetic field-inductive layer 21 and the flux probe film 22, which are uncovered with the resist film 110, are removed by ion milling, etc.

Figure 22:
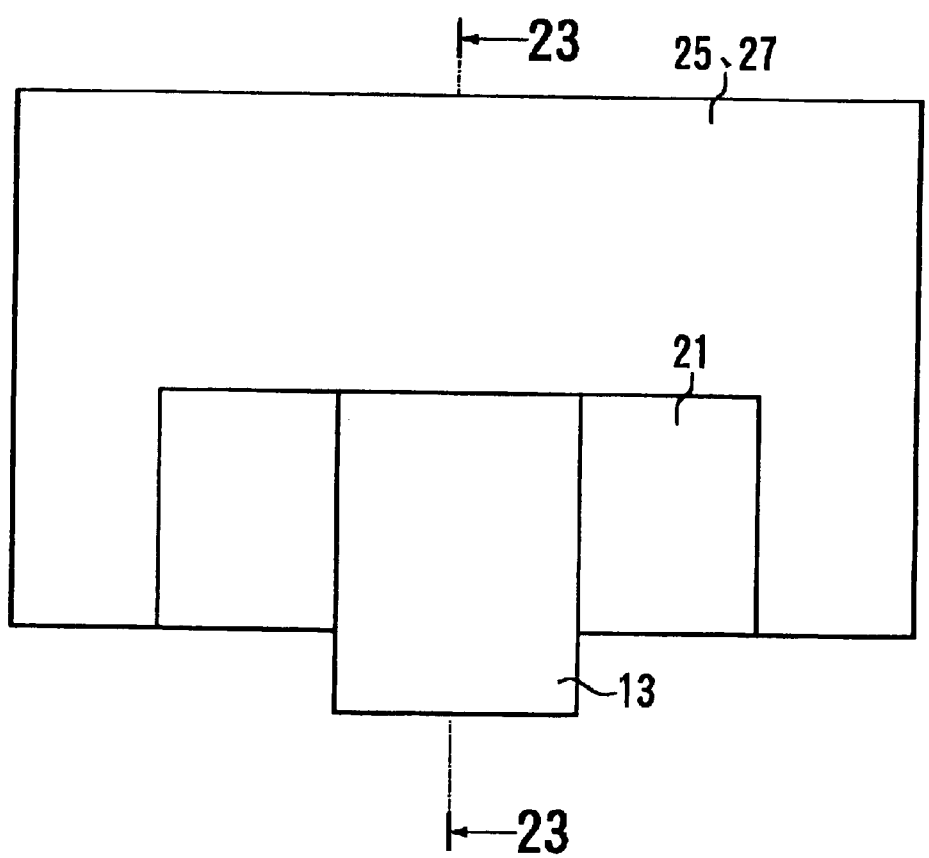
FIG. 22 is a manufacturing step view after the one shown in FIGS. 20 and 21.
Figure 23:
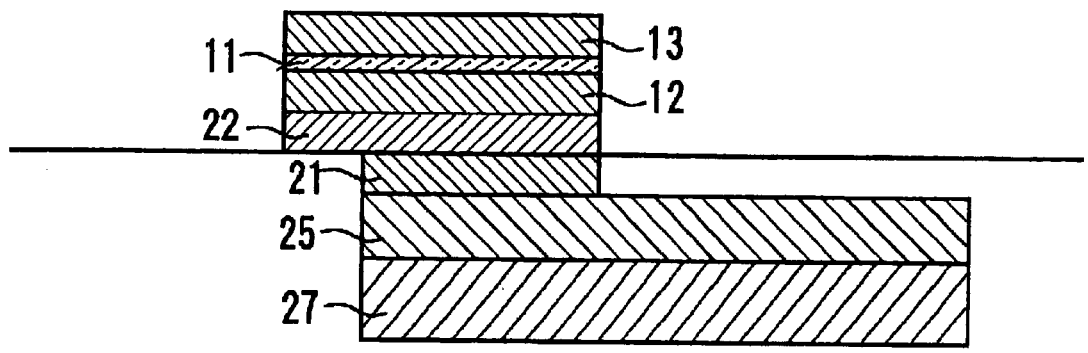
FIG. 23 is a cross sectional view of the manufacturing step view taken on line "23—23" in FIG. 22.

FIGS. 22 and 23 show the state in which the resist film 110 is removed after milling. As shown in FIGS. 22 and 23, the rounded forefronts of the bias magnetic field-inductive layer 21 are removed and then, patterned so as to have a given width and given length. Moreover, the rounded forefronts of the flux guide layer 22 are removed to be patterned in a given width and a given length.

Figure 24:
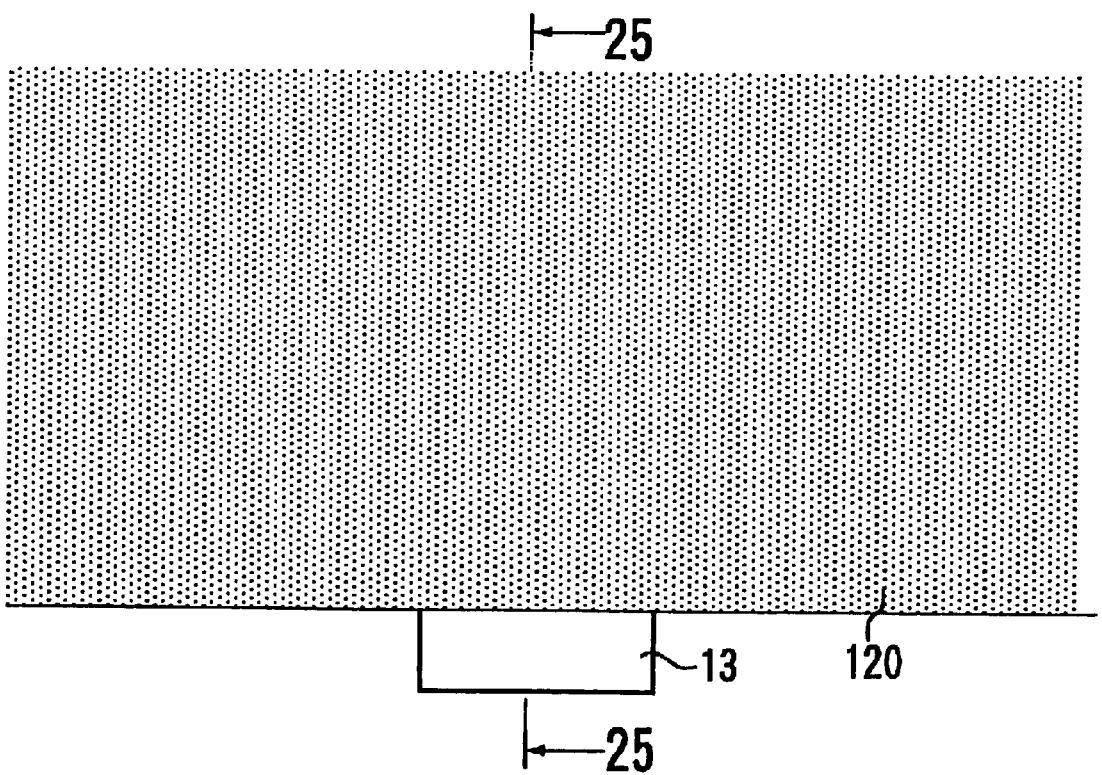
FIG. 24 is a manufacturing step view after the one shown in FIGS. 22 and 23.
Figure 25:
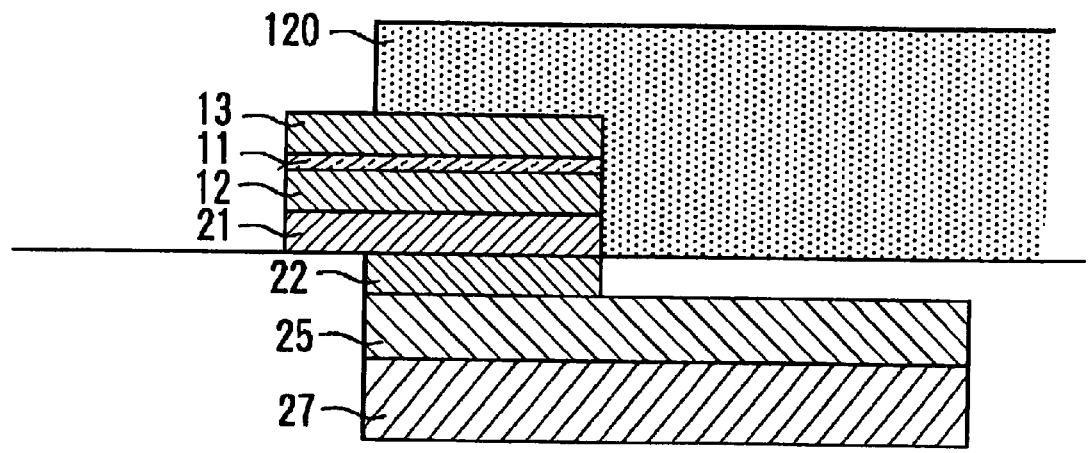
FIG. 25 is a cross sectional view of the manufacturing step view taken on line "25—25" in FIG. 24.
Figure 26:
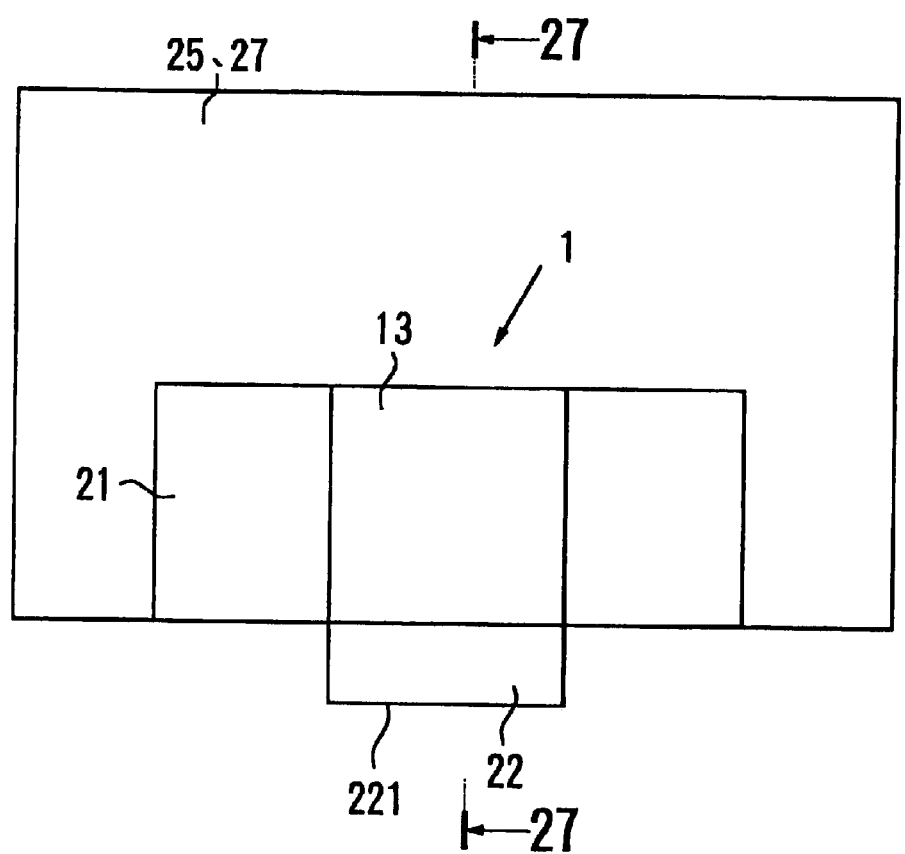
FIG. 26 is a manufacturing step view after the one shown in FIGS. 24 and 25.
Figure 27:
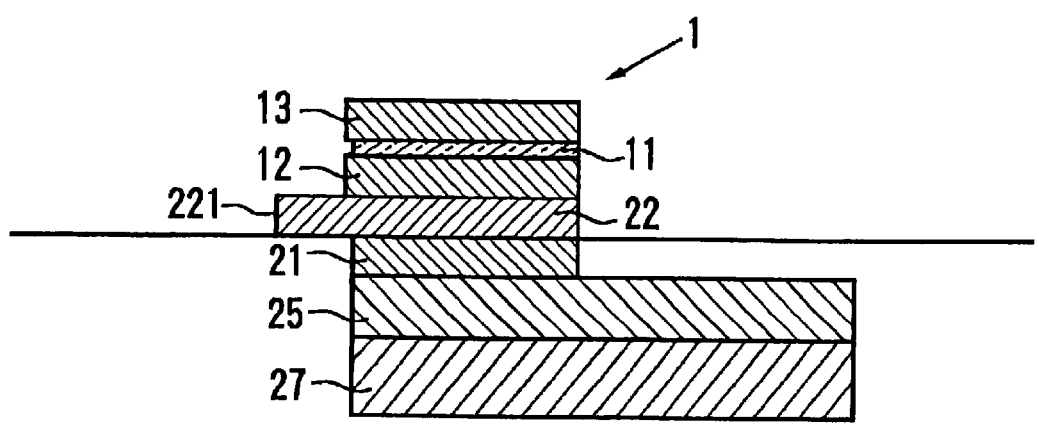
FIG. 27 is a cross sectional view of the manufacturing step view taken on line "27—27" in FIG. 26.

Then, as shown in FIG. 24, a resist film 120 is formed so that a part of the surface of the ferromagnetic tunnel effective film 1 is exposed, and as shown in FIG. 25, ion milling process is carried out. In this ion milling process, the ferromagnetic layer 13, the tunnel barrier layer 11 and the ferromagnetic layer 12, which constitute the ferromagnetic tunnel effective film 1, are ion-milled. As a result, the flux guide layer 22 having the projecting flux probe portion 221 can be obtained, as shown in FIGS. 26 and 27. The TMR element shown in FIGS. 4–6 may be manufactured by the above-mentioned process.

Figure 28:
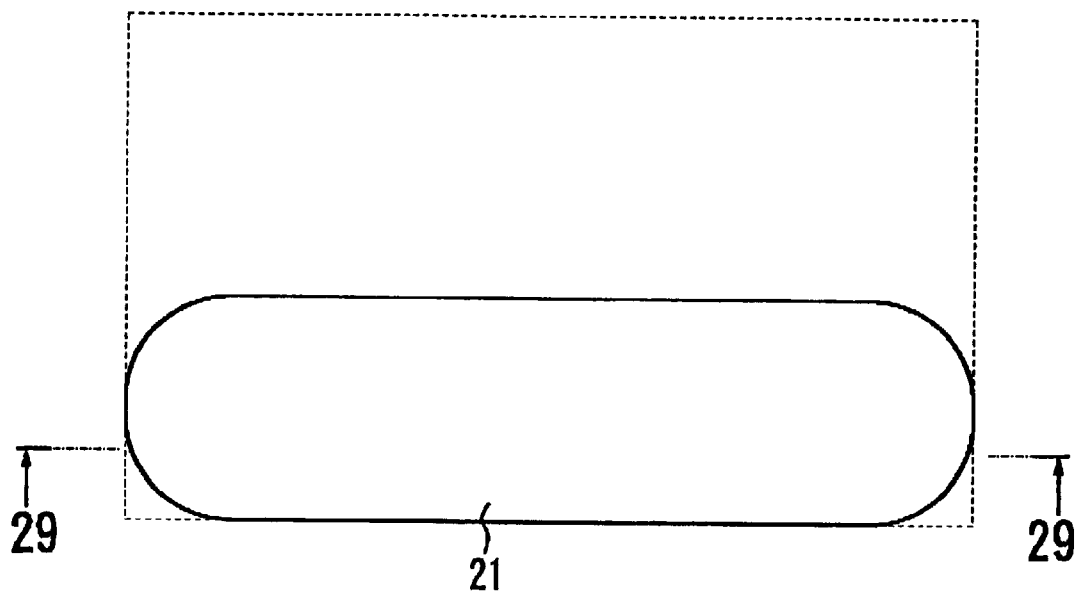
FIG. 28 is a manufacturing step view of the TMR element shown in FIGS. 7 and 8.
Figure 29:
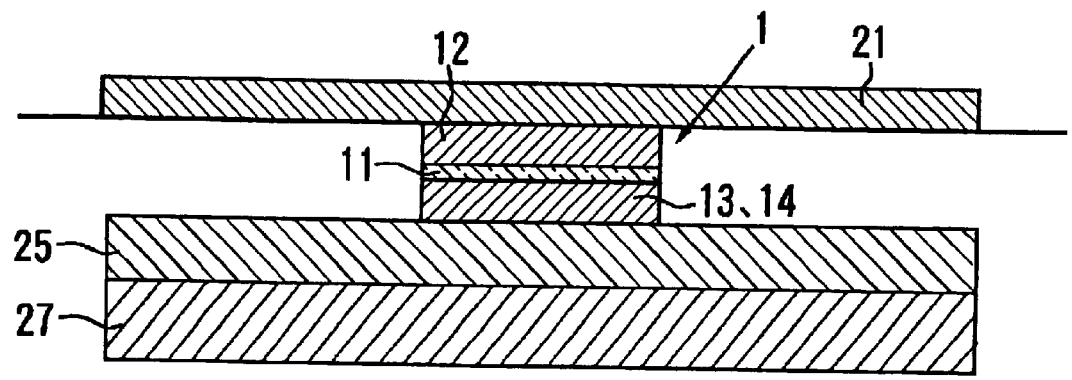
FIG. 29 is a cross sectional view of the manufacturing step view taken on line "29—29" in FIG. 28.

The manufacturing method of the TMR element shown in FIGS. 7 and 8 will be described with reference to FIGS. 28–35 hereinafter. First of all, as shown in FIGS. 28 and 29, a ferromagnetic layer 12 to constitute the free layer, an insulating layer 11 to constitute the tunnel barrier layer and a ferromagnetic layer 13 to constitute the pinned layer are formed on the electrode 25 provided on a shielding layer 27, and then, the bias magnetic field-inductive layer 21 is formed. The shielding layer 27, the electrode 25, the ferromagnetic layer 12, the insulating layer 11 and the ferromagnetic layer 13 are covered with a non-magnetic insulating film made of a ceramic material. As mentioned above, it is desired that the surface of each layer is cleaned by ion etching before forming the above layers 11–13. The surface cleaning enables a resist remaining contaminated layer or an oxide layer from being formed at the boundary between the adjacent layers, and thus, the increase of the resistance of the ferromagnetic tunnel effective film can be repressed.

Figure 30:
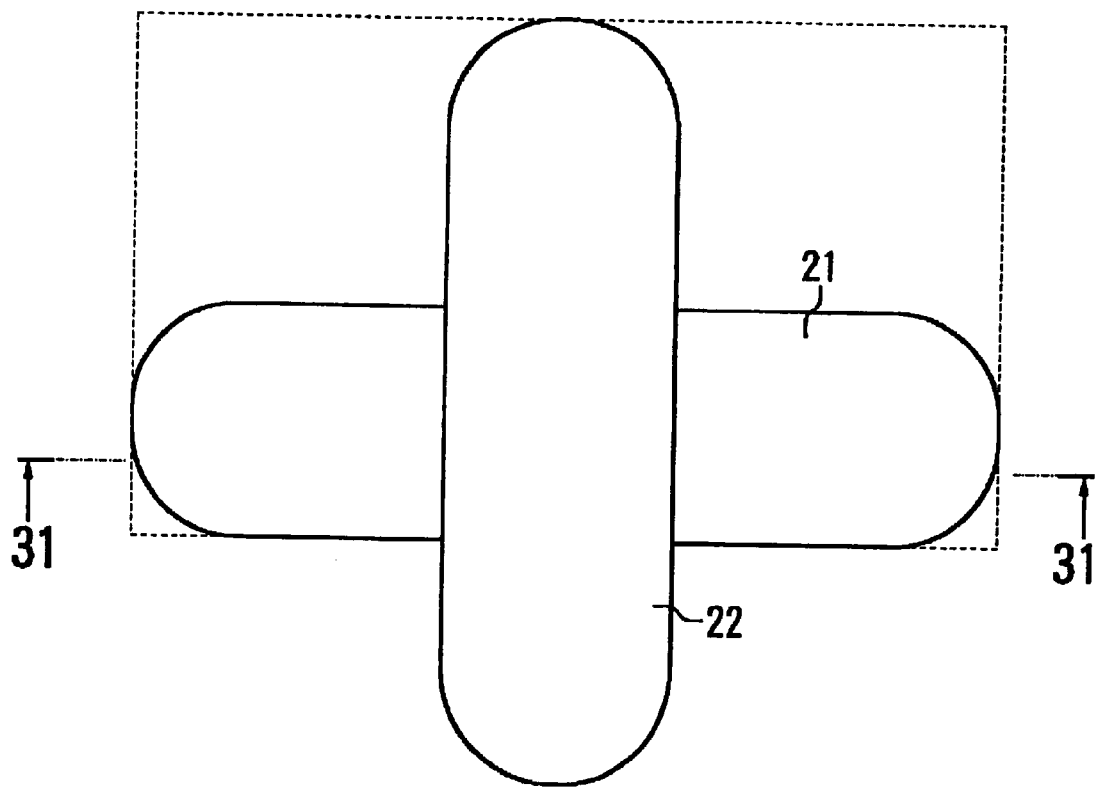
FIG. 30 is a manufacturing step view after the one shown in FIGS. 28 and 29.
Figure 31:
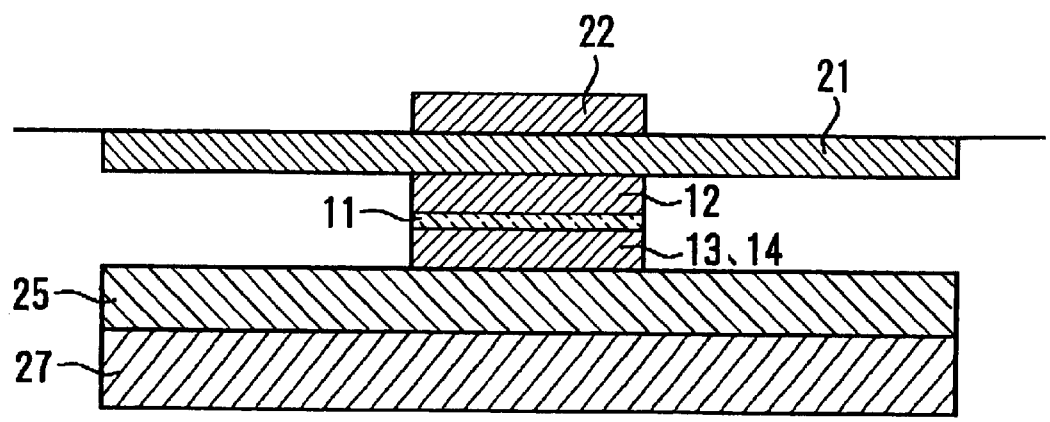
FIG. 31 is a cross sectional view of the manufacturing step view taken on line "31—31" in FIG. 30.

Then, as shown in FIGS. 30 and 31, the flux guide layer 22 is formed on the bias magnetic field-inductive layer 21. As mentioned above, in order to realize a high recording density of 40 Gbspi, it is required to reduce the size of the ferromagnetic tunnel effective film up to 0.4×0.4 ($\mu m^2$). Therefore, the size of the flux guide layer 22 is reduced in accordance with the size reduction of the ferromagnetic tunnel effective film. When the flux guide layer 22 is formed by photolithography technique, the corners of the flux guide layer 22 are made round as shown in FIG. 30.

Figure 32:
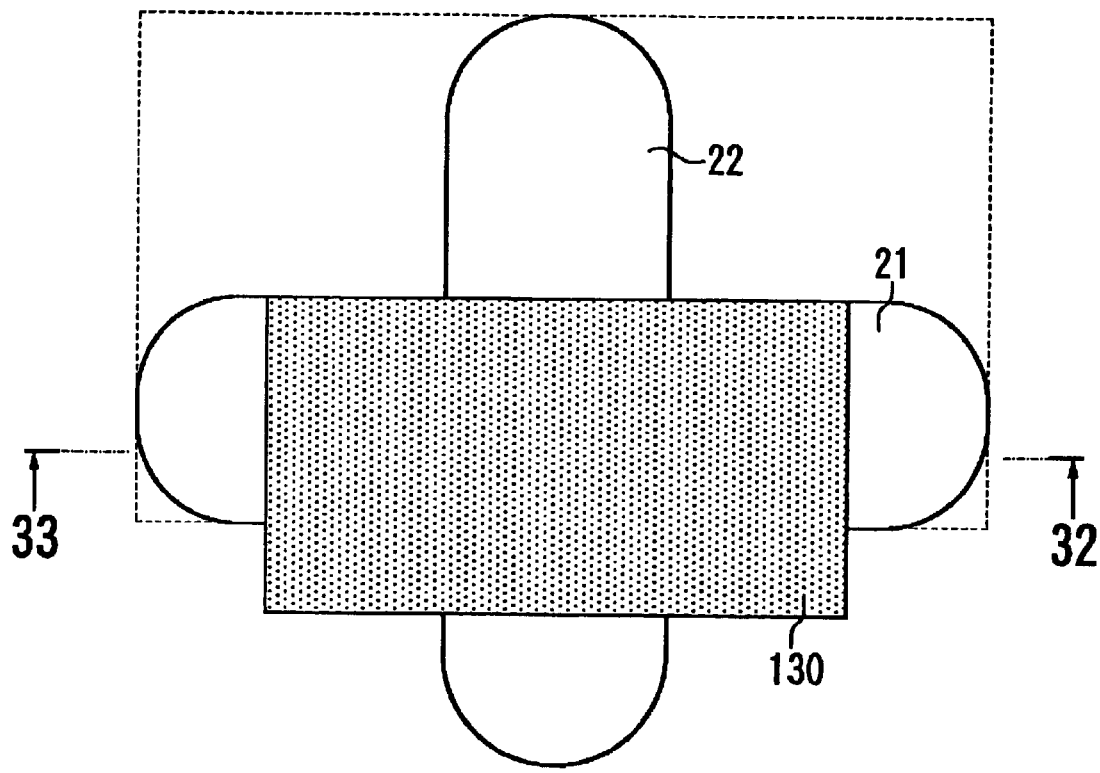
FIG. 32 is a manufacturing step view after the one shown in FIGS. 30 and 31.
Figure 33:
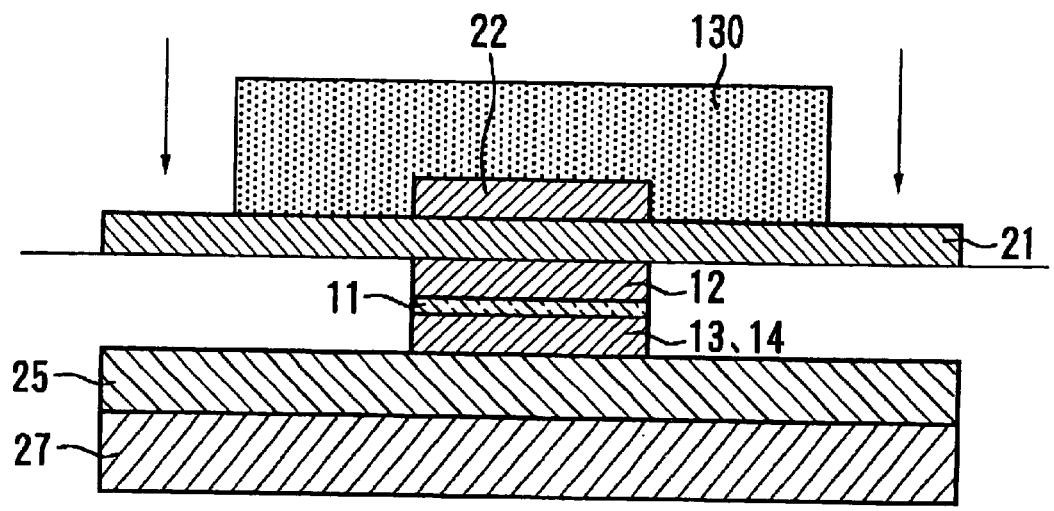
FIG. 33 is a cross sectional view of the manufacturing step view taken on line "33—33" in FIG. 32.

Then, as shown in FIG. 32, a resist film 130 is formed in a given pattern so as to expose both of the rounded forefronts of the bias magnetic field-inductive layer 21 and the both of the rounded forefronts of the flux probe film 22. Then, as shown in FIG. 33, the rounded forefronts of the bias magnetic field-inductive layer 21 and the flux probe film 22, which are uncovered with the resist film 110, are removed by ion milling, etc. As a result, the bias magnetic field-inductive layer 21 and the flux guide layer 22 can be patterned in respective given widths and given lengths.

Figure 34:
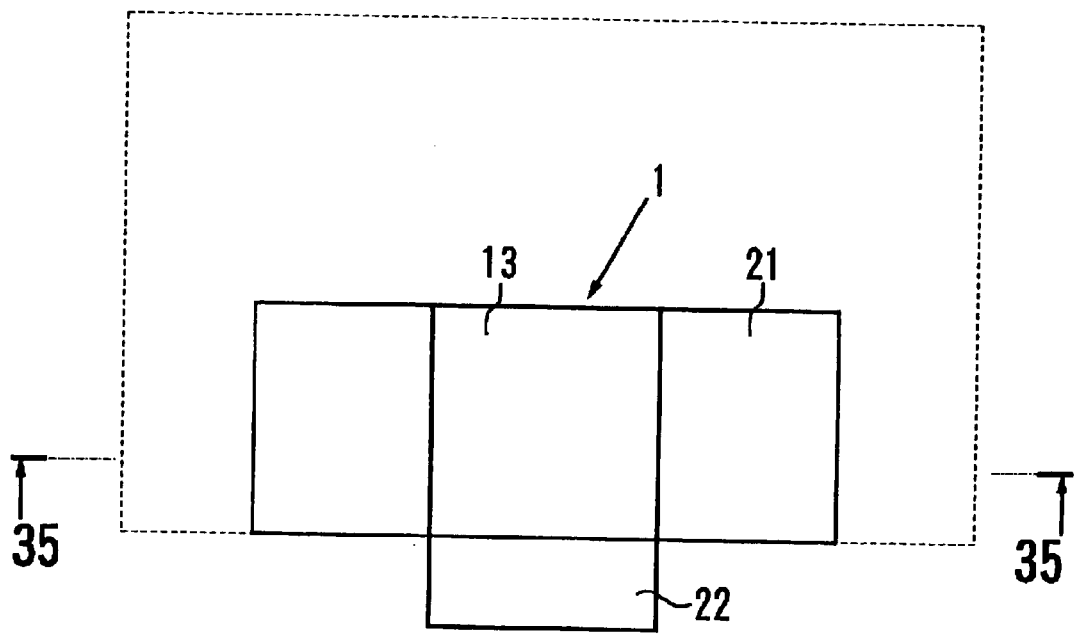
FIG. 34 is a view showing a pattern made by the manufacturing steps shown in FIGS. 32 and 33.
Figure 35:
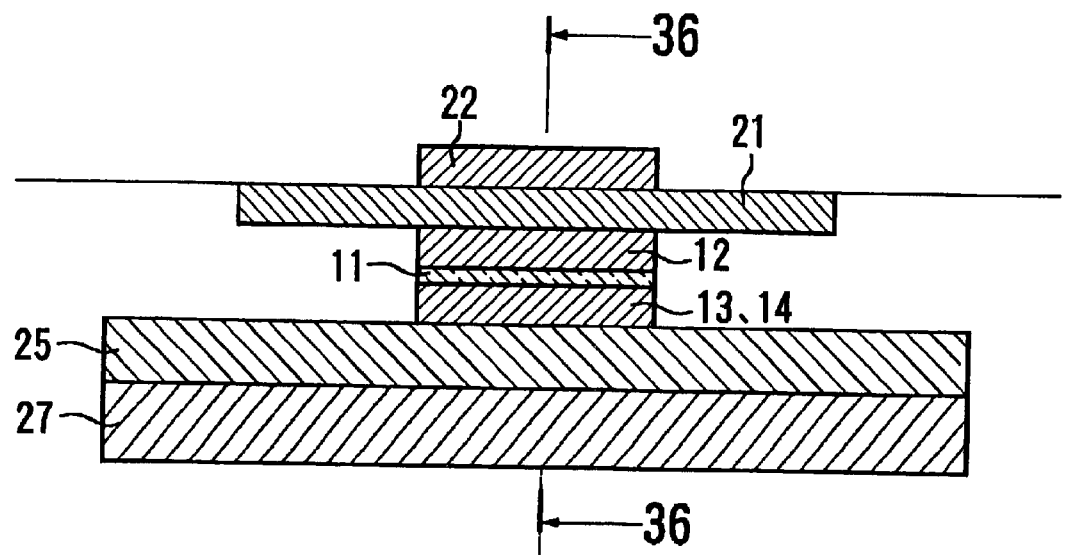
FIG. 35 is a cross sectional view of the manufacturing step view taken on line "35—35" in FIG. 34.
Figure 36:
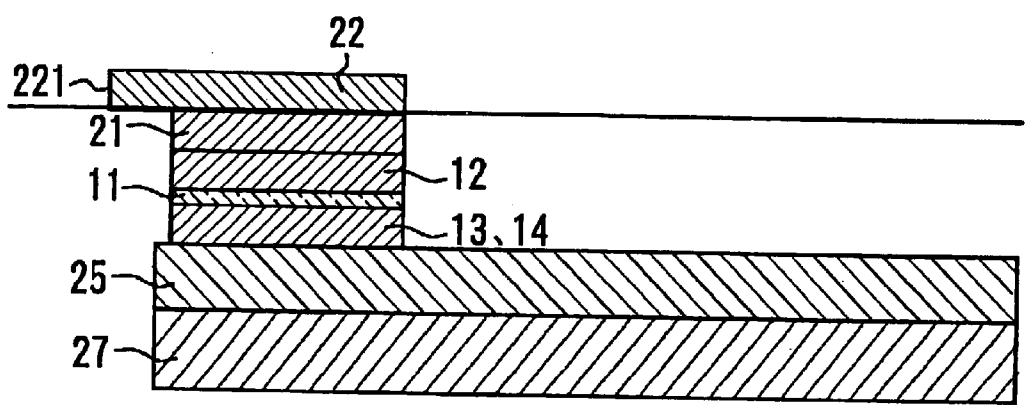
FIG. 36 is a cross sectional view of the manufacturing step view taken on line "36—36" in FIG. 34.

FIGS. 34–36 show the state in which the resist film 130 is removed after milling. As shown in FIGS. 34–36, the rounded forefronts of the bias magnetic field-inductive layer 21 are removed and then, patterned so as to have a given width and given length. Moreover, the rounded forefronts of the flux guide layer 22 are removed to be patterned in a given width and a given length. As a result, the flux guide layer 22 having the projecting flux probe portion 221 can be obtained. The TMR element shown in FIGS. 9 and 10 may be manufactured by the above-mentioned process.

Figure 37:
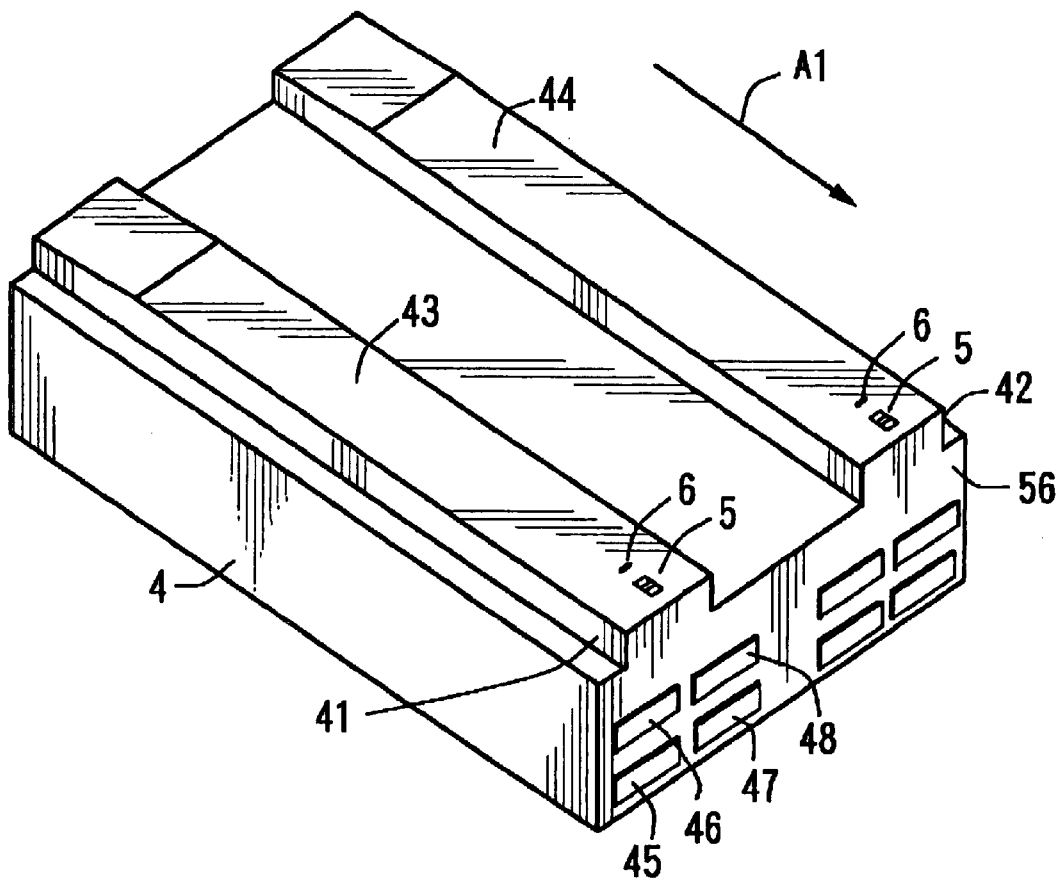
FIG. 37 is a perspective view showing a longitudinal recording thin film magnetic head including the TMR element of the present invention as a reading element and an inductive type electromagnetic converting element as a writing element.
Figure 38:
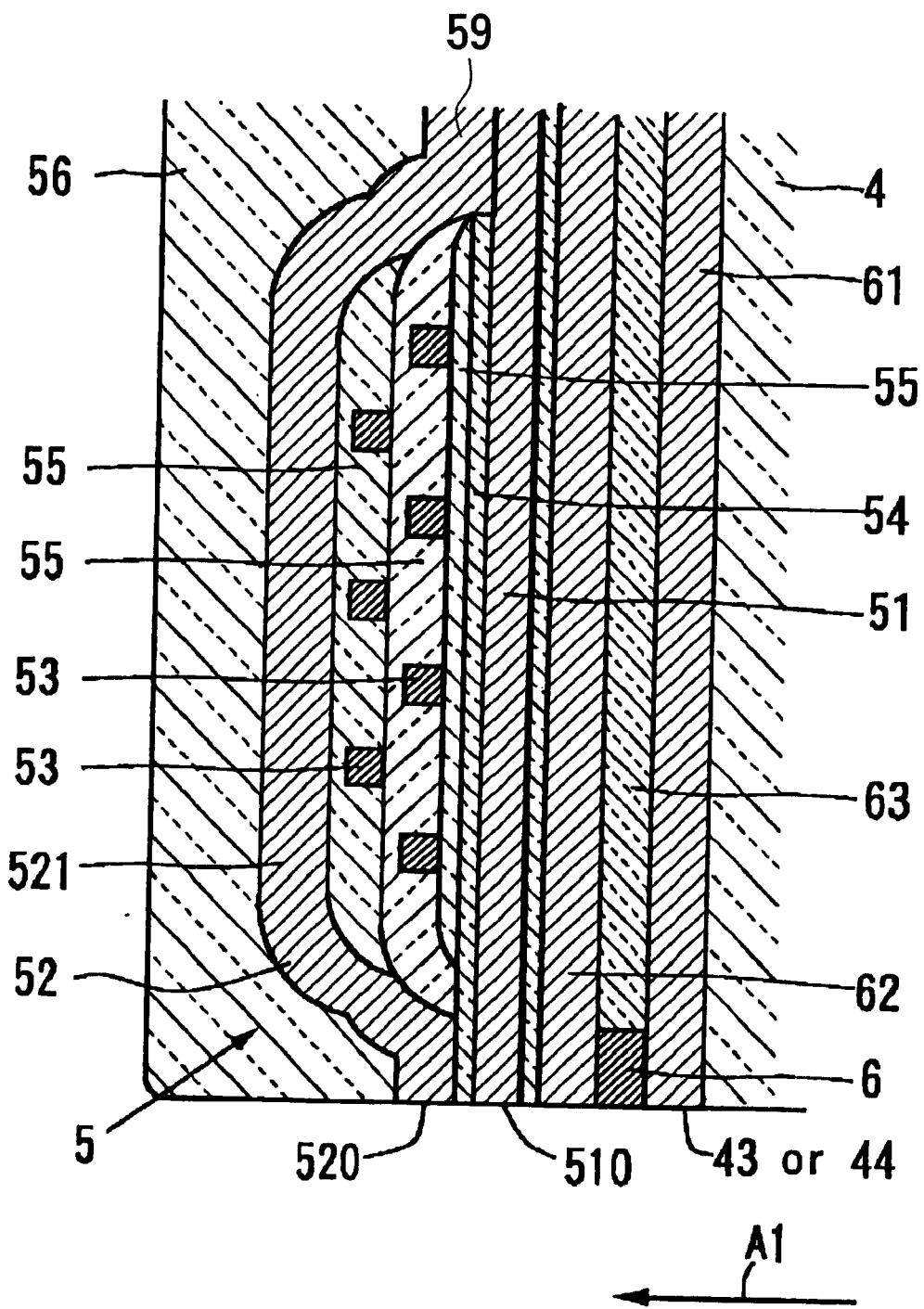
FIG. 38 is an enlarged cross sectional view of the thin film magnetic head shown in FIG. 37.

FIG. 37 is a perspective view showing a longitudinal recording thin film magnetic head having the above TMR element as a reading element and an inductive type magnetoresistive converting element, and FIG. 38 is an enlarged cross sectional view of the thin film magnetic head shown in FIG. 37. The depicted thin film magnetic head has, on a slider 4, a reading element 6 composed of the TMR element of the present invention and a writing element 5 composed of the inductive type magnetoresistive converting element. An arrow A1 designates a medium-running direction. In this figure, the sizes of some parts are exaggerated, and different from the real ones.

The slider 4 has rails 41 and 42 on its opposing surface to a magnetic recording medium, and the surfaces of the rails 41 and 42 are employed as air bearing surfaces (hereinafter, often called as "ABS"s) 43 and 44. The slider 4 does not always have the two rails 41 and 42, and may have one to three rail parts. Moreover, the slider may have a flat surface having no rail. For improving its floating characteristic, the opposing surface of the slider may have various geometrical shapes. This invention can be applied for any types of slider. The slider 41 may have protective films, made of DLC or the like, having a thickness of 8–10 nm on the rails. In this case, the surfaces of the protective films correspond to the ABSs. The slider 41 is a ceramic structural body composed of a substrate 410 made of $Al_2O_3$—TiC, etc. and an inorganic insulating film 420 made of $Al_2O_3$, $SiO_2$ etc. on the substrate 410.

The writing element 5 and the reading element 6 are provided in the trailing edge TR side of either or both of rails 41 and 42. The edge portions of the writing element 5 and the reading element 6 are exposed to the ABSs 43 and 44 for electromagnetic conversion. On the side surfaces in the trailing edge TR are provided pull-out electrodes 45 and 46 connected to the writing element 5 and pull-put electrodes 47 and 48 connected to the reading element 6.

The writing element 5 has a first magnetic film 51 doubling as a second shielding film for the reading element 6, a second magnetic film 52, a coil film 53, a gap film 54 made of alumina or the like, an insulating film 55 and a protective film 56. The second shielding film may be made of another magnetic film.

The forefronts 511 and 521 of the first magnetic film 51 and the second magnetic film 52 are opposed each other via the thin gap film 54, and constitute a pole portion of the thin film magnetic head for writing. The first and second magnetic films 51 and 52 may be composed of a magnetic single layer or a magnetic multilayer for improving the properties of the pole portion. In view of narrowing the track width and developing the recording performance, various modification has been made for the pole portion structure. This invention can be applied for any pole portion structures. The gap film 54 is composed of a non-magnetic metal film or an inorganic insulating film such as alumina.

The second magnetic film 52 is risen up at a given angle on the gap film 54 in the pole portion side. The second magnetic film 52 is extended backward from the ABSs 43 and 44 with keeping a given inner gap for the first magnetic film 51, and joined with the first magnetic film 51 at a backside joining portion 59. As a result, a thin film magnetic circuit is completed with the first and the second magnetic films 51 and 52, and the gap film 54.

The coil film 53 is sandwiched with the first and second magnetic films 51 and 52, and whirled around the backside joining portion 59. Both ends of the coil film 53 are connected to the pull-out electrodes 45 and 46 (see, FIG. 37). The winding number and layer number of the coil film 53 are not restricted. The coil film 53 is embedded in the insulating film 55, which is filled in the inner gap between the first and the second magnetic films 51 and 52 on which the second magnetic film 52 is provided.

The insulating film 55 may be composed of an organic insulating resin film or a ceramic film such as an $Al_2O_3$ film or a $SiO_2$ film. The ceramic insulating film can reduce its maximum protrusion volume than the organic insulating film because it has a smaller heat expansion.

Then, the writing element 5 is covered with a protective film 56 made of an inorganic insulating material such as $Al_2O_3$ or $SiO_2$ entirely.

The reading element 6 is composed of the TMR element of the present invention. The reading element 6 is positioned in an insulating film 63, made of alumina or the like, in between a first shielding film 61 and a second shielding film 62, and connected to the pull-out electrodes 47 and 48 (see, FIG. 37).

Figure 39:
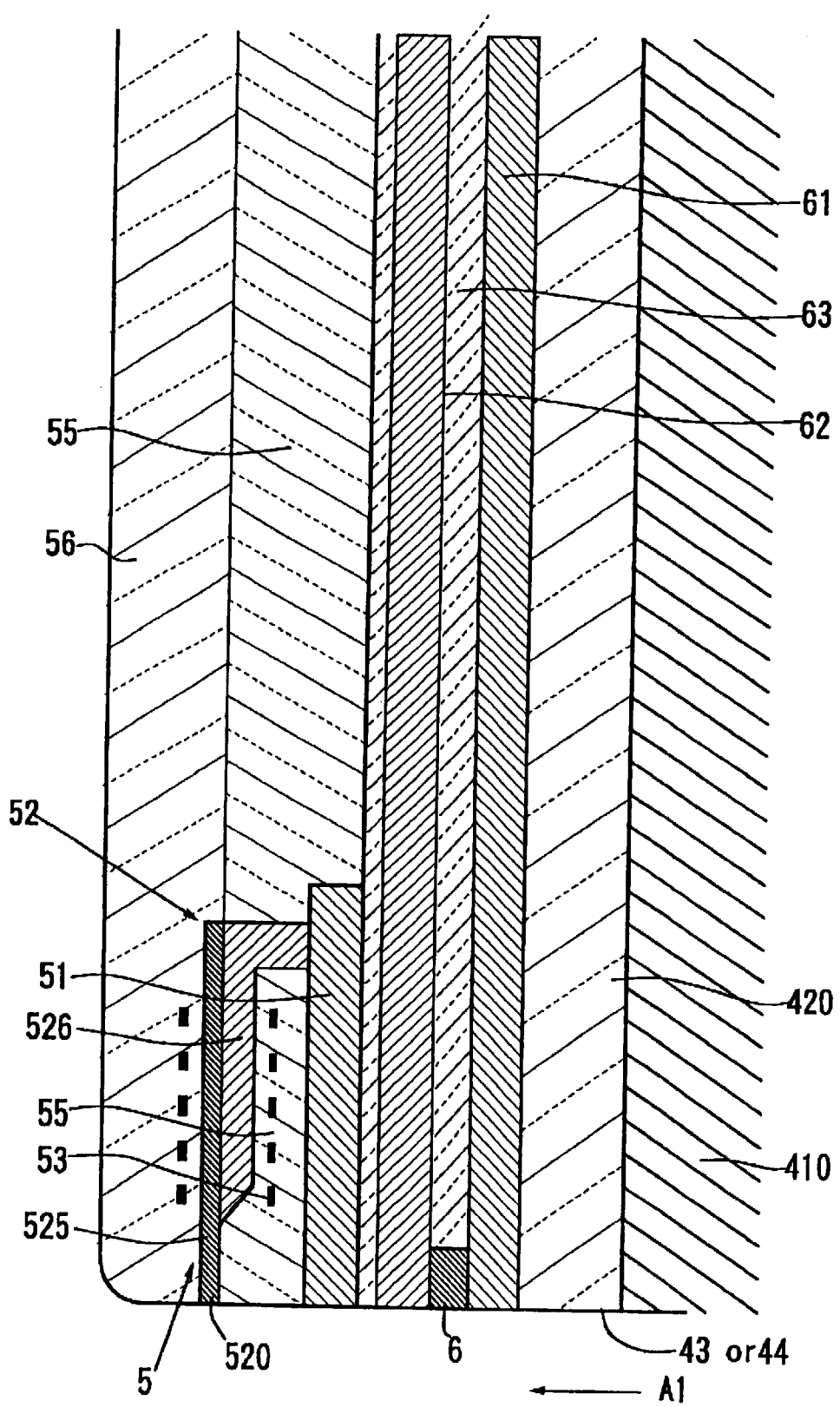
FIG. 39 is an enlarged cross sectional view of a perpendicular recording thin film magnetic head including the TMR element as a reading element.

FIG. 39 is an enlarged cross sectional view showing a perpendicular recording thin film magnetic head. In the perpendicular recording thin film magnetic head, the second magnetic film 52 includes a main magnetic pole 525 and a supplementary magnetic pole 526. The main magnetic pole 525 constitutes a perpendicular writing pole portion, and the supplementary magnetic pole 526 combine the main magnetic pole 525 and the first magnetic film 51 magnetically. The first magnetic film 51 constitutes a returning magnetic path for the magnetic flux generated from the main magnetic pole 525. The coil film 53 is whirled around the main magnetic pole 525 and the supplementary magnetic pole 526. The other parts of the perpendicular recording thin film magnetic head are similar to the ones of the longitudinal recording thin film magnetic head shown in FIG. 37, and thus, detail explanation is not given. The perpendicular recording thin film magnetic head can realize an extremely high density recording because it magnetizes a magnetic recording film of a magnetic disk in a direction perpendicular to the surface thereof.

Figure 40:
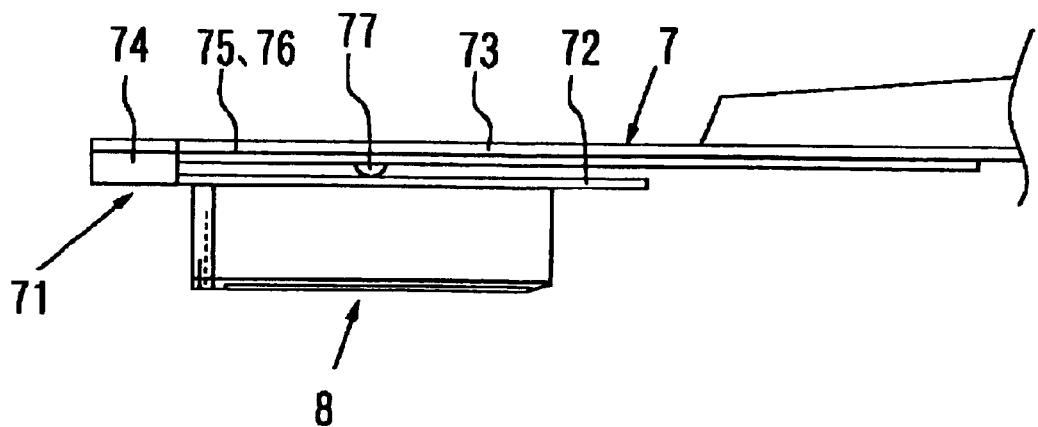
FIG. 40 is an elevational view showing a part of a magnetic head device according to the present invention.
Figure 41:
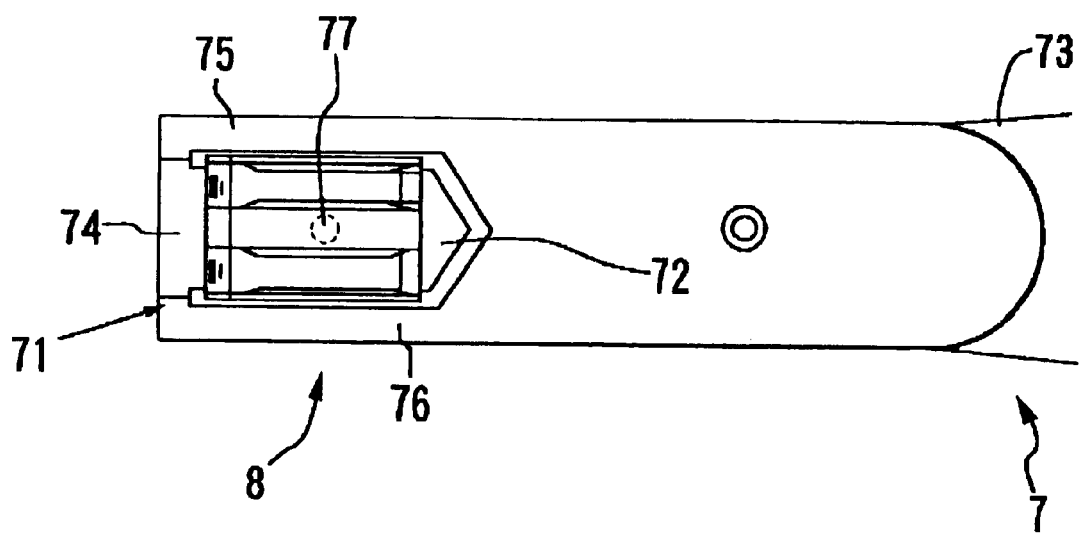
FIG. 41 is an elevational view showing a part of a magnetic head device according to the present invention.

FIG. 40 is an elevational view showing a part of a magnetic head device according to the present invention, and FIG. 41 is a bottom plan view of the magnetic head device in FIG. 40. A depicted magnetic head device includes a thin film magnetic head 8 and a head supporting device 7. The thin film head 8 is similar to the one shown in FIGS. 7 and 8 according to the present invention.

The head supporting device 7 supports the thin film magnetic head 8 at the under surface of a flexible member 71 made of a metallic plate attached on the free edge thereof in the long direction of a supporting member 73 made of a metallic plate.

The flexible member 71 has two outer frames 75 and 76 extending along the long direction of the supporting member 73, a side frame 74 to join the outer frames 75 and 76 at the edge thereof, and a tongue-shaped member 72, of which one end is a free edge, extending along the outer frames 75 and 76 from the center of the side frame.

On the center of the tongue-shaped member 72 is positioned a hemispherical loading protrusion 77, bulging on the supporting member 73, to apply load to the tongue-shaped member 72.

The thin film magnetic head 8 is attached on the under surface of the tongue-shaped member 72 by adhesive agent so that it can have its air outflow edge along the side frame 74. In addition to the above head supporting device 7, various device may be available.

Figure 42:
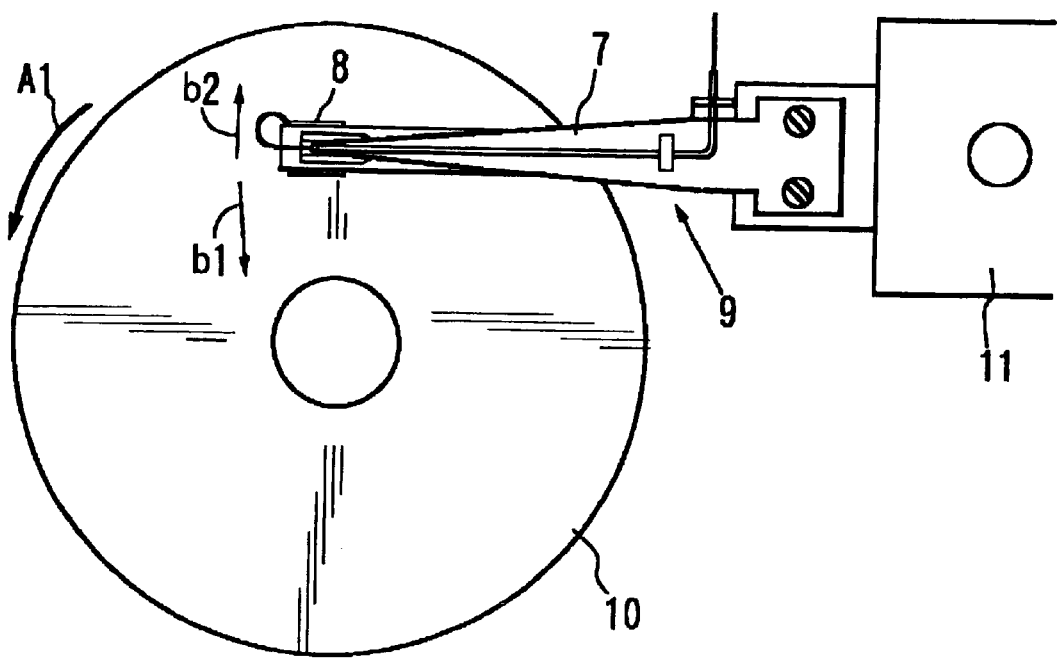
FIG. 42 is a schematic view showing a magnetic disk drive device according to the present invention.

FIG. 42 is a schematic view showing a magnetic disk drive device according to the present invention. The depicted magnetic disk drive device includes a magnetic head device 9 similar to the one shown in FIGS. 40 and 41 and a magnetic disk 10. The magnetic head device 9 is driven by a position determining device 11 which supports one end of the device 9. The thin film magnetic head 8 of the magnetic head device 9 is supported by the head supporting device 5 so that it can face the magnetic recording surface of the magnetic disk 10.

When the magnetic disk 10 is rotated in an A1 direction by a not shown driving device, the thin film magnetic head 8 is floated from on the magnetic disk 10 by a minute distance. The magnetic recording drive device shown in FIG. 42 is called as a "rotary-actuator driving system". In this case, the thin film magnetic head 8 attached to the forefront of the head supporting device 7 is driven in a radial direction b1 or b2 of the magnetic disk 10 and positioned on a given track by the position determining device 11 to rotate the head supporting device 7. Then, the magnetic recording and reading are carried out on the given track by the writing element 5 and the reading element 6 having the above TMR element, respectively.

This invention has been described in detail with reference to the above preferred concrete embodiments, but it is obvious for the ordinary person skilled in the art that various modifications can be made in its configuration and detail without departing from the scope of this invention.

As mentioned above, this invention can provide (a) the TMR element, the thin film magnetic head, the magnetic head device and the magnetic disk drive device which are applicable for super high density recording, and (b) the TMR element, the thin film magnetic head, the magnetic head device and the magnetic disk drive device which can have their respective high precise reading track widths.

What is claimed is:

1. A tunnel magnetoresistive effective element comprising a ferromagnetic tunnel effective film, a bias magnetic field-inductive structure and a flux guide layer, the ferromagnetic tunnel effective film including a free layer, a pinned layer and a tunnel barrier layer sandwiched between the free layer and the pinned layer, the bias magnetic field-inductive structure including biasing means contacting each end of a bias field inductive-layer as a soft ferromagnetic layer, the layer conducting the magnetic field from the biasing means to the free layer, applying a given magnetic field to the free layer, and having its larger width than that of the ferromagnetic tunnel effective film as viewed from the bias magnetic field direction, the flux guide layer being stacked with the bias magnetic field-inductive layer so that its long direction is crossed to the bias magnetic field from the bias magnetic field-inductive layer, and being magnetically connected to the free layer, one end of the flux guide layer constituting a flux probe portion having a narrower width than that of the bias magnetic field-inductive layer and projecting from the ends of the bias magnetic field-inductive layer.

2. A tunnel magnetoresistive effective element as defined in claim 1, wherein in the ferromagnetic tunnel effective film, the free layer, the tunnel barrier layer and the pinned layer are stacked in turn, and the flux guide layer is stacked on the bias magnetic field-inductive layer, and the free layer of the ferromagnetic tunnel effective film is adjacent to the flux guide layer.

3. A tunnel magnetoresistive effective element as defined in claim 2, wherein the flux guide layer is integrated with the free layer.

4. A tunnel magnetoresistive effective element as defined in claim 1, wherein in the ferromagnetic tunnel effective film, the pinned layer, the tunnel barrier layer and the free layer are stacked in turn, and the bias magnetic field-inductive layer is adjacent to the free layer, and the flux guide layer is stacked on the bias magnetic field-inductive layer.

5. A tunnel magnetoresistive effective element as defined in claim 1, wherein the bias magnetic field-inductive layer has bias means which are contacted on both ends of the bias magnetic field effective layer in the width direction thereof and separated from both ends of the pinned layer by a distance G in the width direction thereof.

6. A tunnel magnetoresistive effective element as defined in claim 5, wherein the bias means is made of a high coercive force material, an antiferromagnetic material or a laminated body composed of an antiferromagnetic layer and at least one ferromagnetic layer.

7. A tunnel magnetoresistive effective element as defined in claim 1, further comprising a pinning layer to pin the magnetization direction of the pinned layer.

8. A tunnel magnetoresistive effective element as defined in claim 1, further comprising a pair of electrodes which are provided so as to sandwich the ferromagnetic tunnel effective film to be opposed each other and are electrically connected to the ferromagnetic tunnel effective film.

9. A tunnel magnetoresistive effective element as defined in claim 8, further comprising a pair of shielding films which are provided so as to sandwich the pair of electrodes to be opposed each other.

10. A thin film magnetic head comprising at least one reading element composed of a tunnel magnetoresistive effective element as defined in claim 1.

11. A thin film magnetic head as defined in claim 10, further comprising at least one writing element.

12. A thin film magnetic head as defined in claim 11, wherein the writing element is composed of an inductive type electromagnetic converting element including a first magnetic film, a second magnetic film and a gap film, and the forefronts of the first magnetic film and the second magnetic film are separated by the gap film, thereby to constitute a writing pole portion.

13. A thin film magnetic head as defined in claim 11, wherein the writing element is composed of an inductive type electromagnetic converting element including a first magnetic film and a second magnetic film having a main magnetic pole portion to constitute a perpendicular writing pole portion and a supplementary magnetic pole portion to magnetically combine the main magnetic pole portion and the first magnetic film.

14. A magnetic head device comprising a thin film magnetic head as defined in claim 10 and a head supporting device to support the thin film magnetic head.

15. A magnetic recording drive device comprising a magnetic head device as defined in claim 14 and a magnetic disk to be magnetically recorded and reproduced by the magnetic head device.

* * * * *